US012568010B2

(12) United States Patent
Soltani et al.

(10) Patent No.: US 12,568,010 B2
(45) Date of Patent: Mar. 3, 2026

(54) FREQUENCY DOMAIN MULTIPLEXING OF A DATA SIGNAL AND A REFERENCE SIGNAL

(71) Applicant: QUALCOMM Incorporated, San Diego, CA (US)

(72) Inventors: Morteza Soltani, San Diego, CA (US); Jing Sun, San Diego, CA (US); Xiaoxia Zhang, San Diego, CA (US); Raviteja Patchava, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 18/353,636

(22) Filed: Jul. 17, 2023

(65) Prior Publication Data

US 2025/0030585 A1     Jan. 23, 2025

(51) Int. Cl.
H04L 27/26 (2006.01)
H04L 5/00 (2006.01)

(52) U.S. Cl.
CPC ........ H04L 27/2613 (2013.01); H04L 5/0051 (2013.01); H04L 27/2636 (2013.01)

(58) Field of Classification Search
None
See application file for complete search history.

(56) References Cited

U.S. PATENT DOCUMENTS

| | | | | | |
|---|---|---|---|---|---|
| 11,108,526 | B2 * | 8/2021 | Sarkis | .................. | H04W 52/12 |
| 12,368,558 | B2 * | 7/2025 | Kwak | .................. | H04L 5/0051 |

| | | | | | |
|---|---|---|---|---|---|
| 2011/0188540 | A1 * | 8/2011 | Ohwatari | .............. | H04L 5/0058 |
| | | | | | 375/285 |
| 2018/0145803 | A1 | 5/2018 | Park et al. | | |
| 2018/0145854 | A1 * | 5/2018 | Akkarakaran | ...... | H04L 27/2636 |
| 2018/0206132 | A1 * | 7/2018 | Guo | ........................ | H04W 16/28 |
| 2019/0158331 | A1 * | 5/2019 | Pawar | ................. | H04L 27/2605 |
| 2019/0222399 | A1 * | 7/2019 | Huang | ...................... | H04L 5/26 |
| 2019/0261324 | A1 * | 8/2019 | Nam | ..................... | H04L 5/0048 |
| 2019/0334751 | A1 * | 10/2019 | Liu | ........................ | H04L 5/0094 |
| 2020/0244503 | A1 * | 7/2020 | Bala | ...................... | H04L 5/0007 |

(Continued)

FOREIGN PATENT DOCUMENTS

WO        2022172177 A1      8/2022

OTHER PUBLICATIONS

International Search Report and Written Opinion—PCT/US2024/034748—ISA/EPO—Oct. 8, 2024.

*Primary Examiner* — Otis L Thompson, Jr.

(74) *Attorney, Agent, or Firm* — QUALCOMM Incorporated

(57)        ABSTRACT

Various aspects of the present disclosure generally relate to wireless communication. In some aspects, a transmitting device may generate a frequency-domain-multiplexed signal by performing frequency domain multiplexing of a data signal and a reference signal within a symbol of a discrete Fourier transform spread orthogonal frequency domain multiplexing waveform communication, the reference signal being one of a demodulation reference signal, a sounding reference signal, or a channel state information reference signal. The transmitting device may transmit, to a receiving device, the frequency-domain-multiplexed signal. Numerous other aspects are described.

30 Claims, 12 Drawing Sheets

(56)              References Cited

U.S. PATENT DOCUMENTS

| | | | | |
|---|---|---|---|---|
| 2020/0259612 | A1* | 8/2020 | Nakamura | H04L 5/0053 |
| 2020/0403767 | A1 | 12/2020 | Kakishima et al. | |
| 2021/0058903 | A1* | 2/2021 | Takeda | H04W 72/04 |
| 2021/0168011 | A1* | 6/2021 | Davydov | H04J 11/005 |
| 2021/0297221 | A1* | 9/2021 | Lee | H04L 5/0053 |
| 2022/0029762 | A1* | 1/2022 | Ren | H04L 27/2613 |
| 2022/0078777 | A1* | 3/2022 | Huang | H04L 5/0051 |
| 2023/0163932 | A1* | 5/2023 | Bengtsson | H04L 25/0202 |
| | | | | 370/329 |
| 2023/0231683 | A1* | 7/2023 | Ali | H04L 5/0051 |
| | | | | 370/329 |

* cited by examiner

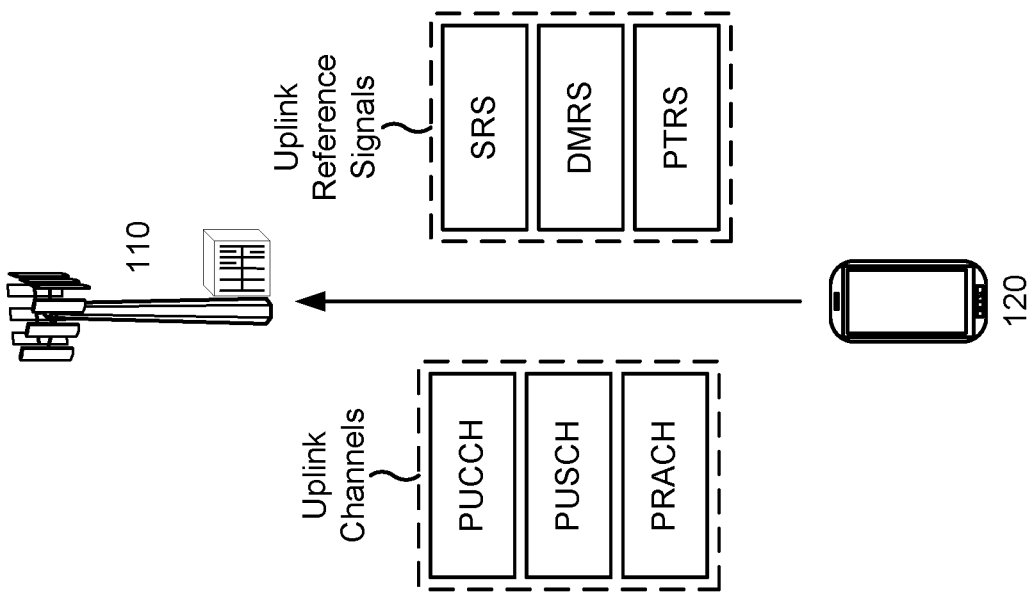
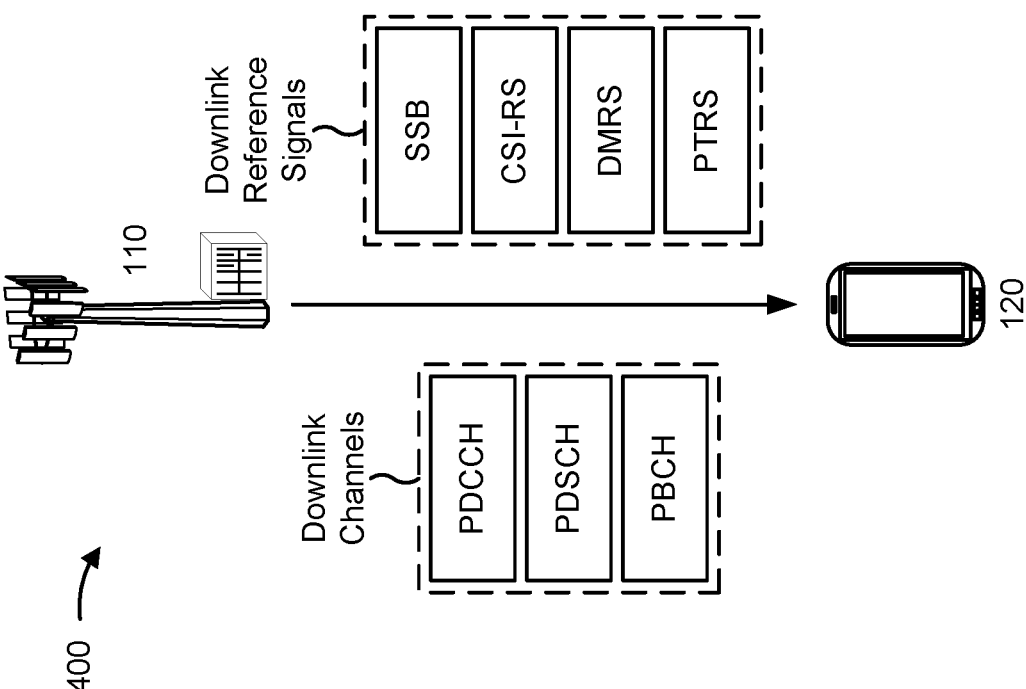
FIG. 4

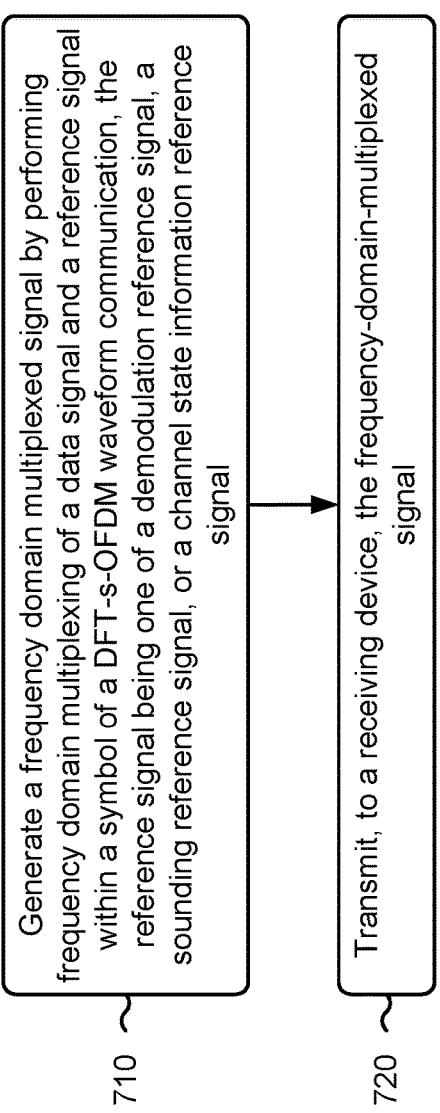

710 — Generate a frequency domain multiplexed signal by performing frequency domain multiplexing of a data signal and a reference signal within a symbol of a DFT-s-OFDM waveform communication, the reference signal being one of a demodulation reference signal, a sounding reference signal, or a channel state information reference signal 720 — Transmit, to a receiving device, the frequency-domain-multiplexed signal

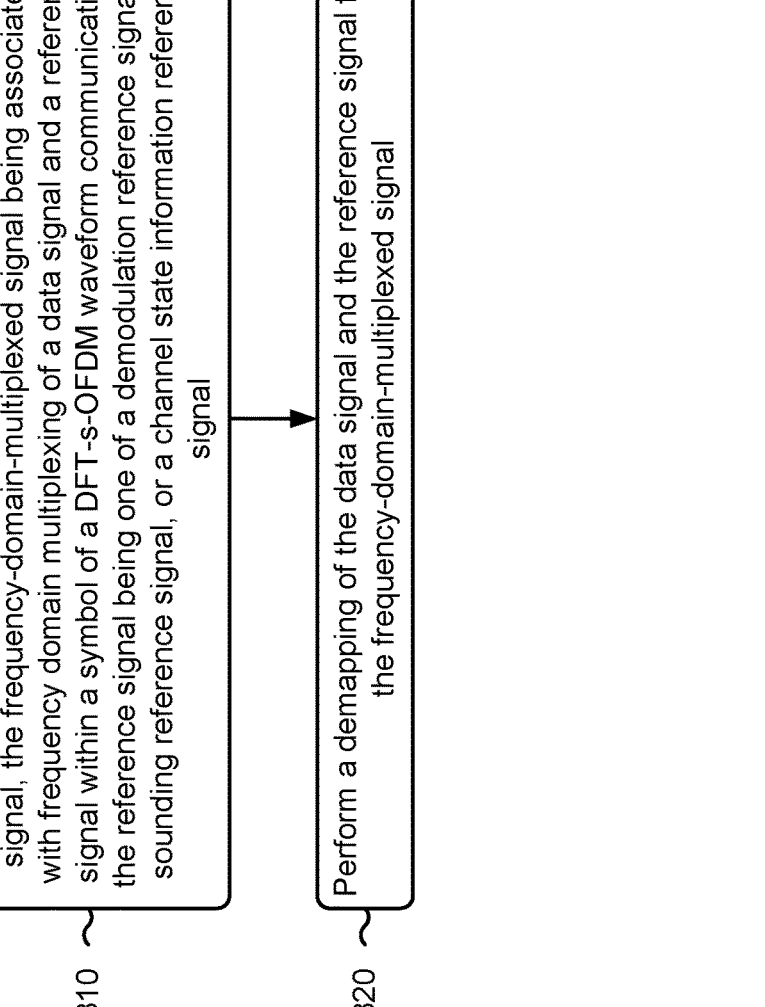

810 — Receive, from a transmitting device, a frequency-domain-multiplexed signal, the frequency-domain-multiplexed signal being associated with frequency domain multiplexing of a data signal and a reference signal within a symbol of a DFT-s-OFDM waveform communication, the reference signal being one of a demodulation reference signal, a sounding reference signal, or a channel state information reference signal 820 — Perform a demapping of the data signal and the reference signal from the frequency-domain-multiplexed signal

FREQUENCY DOMAIN MULTIPLEXING OF A DATA SIGNAL AND A REFERENCE SIGNAL

FIELD OF THE DISCLOSURE

Aspects of the present disclosure generally relate to wireless communication and to techniques and apparatuses for frequency domain multiplexing of a data signal and a reference signal.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a transmitting device.

The method may include generating a frequency-domain-multiplexed signal by performing frequency domain multiplexing of a data signal and a reference signal within a symbol of a discrete Fourier transform spread orthogonal frequency domain multiplexing (DFT-s-OFDM) waveform communication, the reference signal being one of a demodulation reference signal, a sounding reference signal, or a channel state information reference signal. The method may include transmitting, to a receiving device, the frequency-domain-multiplexed signal.

Some aspects described herein relate to a method of wireless communication performed by a receiving device. The method may include receiving, from a transmitting device, a frequency-domain-multiplexed signal, the frequency-domain-multiplexed signal being associated with frequency domain multiplexing of a data signal and a reference signal within a symbol of a DFT-s-OFDM waveform communication, the reference signal being one of a demodulation reference signal, a sounding reference signal, or a channel state information reference signal. The method may include demapping the data signal and the reference signal from the frequency-domain-multiplexed signal.

Some aspects described herein relate to a transmitting device for wireless communication. The transmitting device may include one or more memories and one or more processors coupled to the one or more memories. The one or more processors may be configured to generate a frequency-domain-multiplexed signal by performing frequency domain multiplexing of a data signal and a reference signal within a symbol of a DFT-s-OFDM waveform communication, the reference signal being one of a demodulation reference signal, a sounding reference signal, or a channel state information reference signal. The one or more processors may be configured to transmit, to a receiving device, the frequency-domain-multiplexed signal.

Some aspects described herein relate to a receiving device for wireless communication. The receiving device may include one or more memories and one or more processors coupled to the one or more memories. The one or more processors may be configured to receive, from a transmitting device, a frequency-domain-multiplexed signal, the frequency-domain-multiplexed signal being associated with frequency domain multiplexing of a data signal and a reference signal within a symbol of a DFT-s-OFDM waveform communication, the reference signal being one of a demodulation reference signal, a sounding reference signal, or a channel state information reference signal. The one or more processors may be configured to perform a demapping of the data signal and the reference signal from the frequency-domain-multiplexed signal.

Some aspects described herein relate to a non-transitory computer-readable medium that stores a set of instructions for wireless communication by a transmitting device. The set of instructions, when executed by one or more processors of the transmitting device, may cause the transmitting device to generate a frequency-domain-multiplexed signal by performing frequency domain multiplexing of a data signal and a reference signal within a symbol of a DFT-s-OFDM waveform communication, the reference signal being one of a demodulation reference signal, a sounding reference signal, or a channel state information reference signal. The set of instructions, when executed by one or more processors of the transmitting device, may cause the transmitting device to transmit, to a receiving device, the frequency-domain-multiplexed signal.

Some aspects described herein relate to a non-transitory computer-readable medium that stores a set of instructions for wireless communication by a receiving device. The set of instructions, when executed by one or more processors of the receiving device, may cause the receiving device to receive, from a transmitting device, a frequency-domain-multiplexed signal, the frequency-domain-multiplexed signal being associated with frequency domain multiplexing of a data signal and a reference signal within a symbol of a DFT-s-OFDM waveform communication, the reference signal being one of a demodulation reference signal, a sounding reference signal, or a channel state information reference signal. The set of instructions, when executed by one or more processors of the receiving device, may cause the receiving device to perform a demapping of the data signal and the reference signal from the frequency-domain-multiplexed signal.

Some aspects described herein relate to an apparatus for wireless communication. The apparatus may include means for generating a frequency-domain-multiplexed signal by performing frequency domain multiplexing of a data signal and a reference signal within a symbol of a DFT-s-OFDM waveform communication, the reference signal being one of a demodulation reference signal, a sounding reference signal, or a channel state information reference signal. The apparatus may include means for transmitting, to a receiving device, the frequency-domain-multiplexed signal.

Some aspects described herein relate to an apparatus for wireless communication. The apparatus may include means for receiving, from a transmitting device, a frequency-domain-multiplexed signal, the frequency-domain-multiplexed signal being associated with frequency domain multiplexing of a data signal and a reference signal within a symbol of a DFT-s-OFDM waveform communication, the reference signal being one of a demodulation reference signal, a sounding reference signal, or a channel state information reference signal. The apparatus may include means for performing a demapping of the data signal and the reference signal from the frequency-domain-multiplexed signal.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of physical channels and reference signals in a wireless network, in accordance with the present disclosure.

FIG. 7 is a diagram illustrating an example process performed, for example, by a transmitting device, in accordance with the present disclosure.

FIG. 8 is a diagram illustrating an example process performed, for example, by a receiving device, in accordance with the present disclosure.

DETAILED DESCRIPTION

Figure 1:
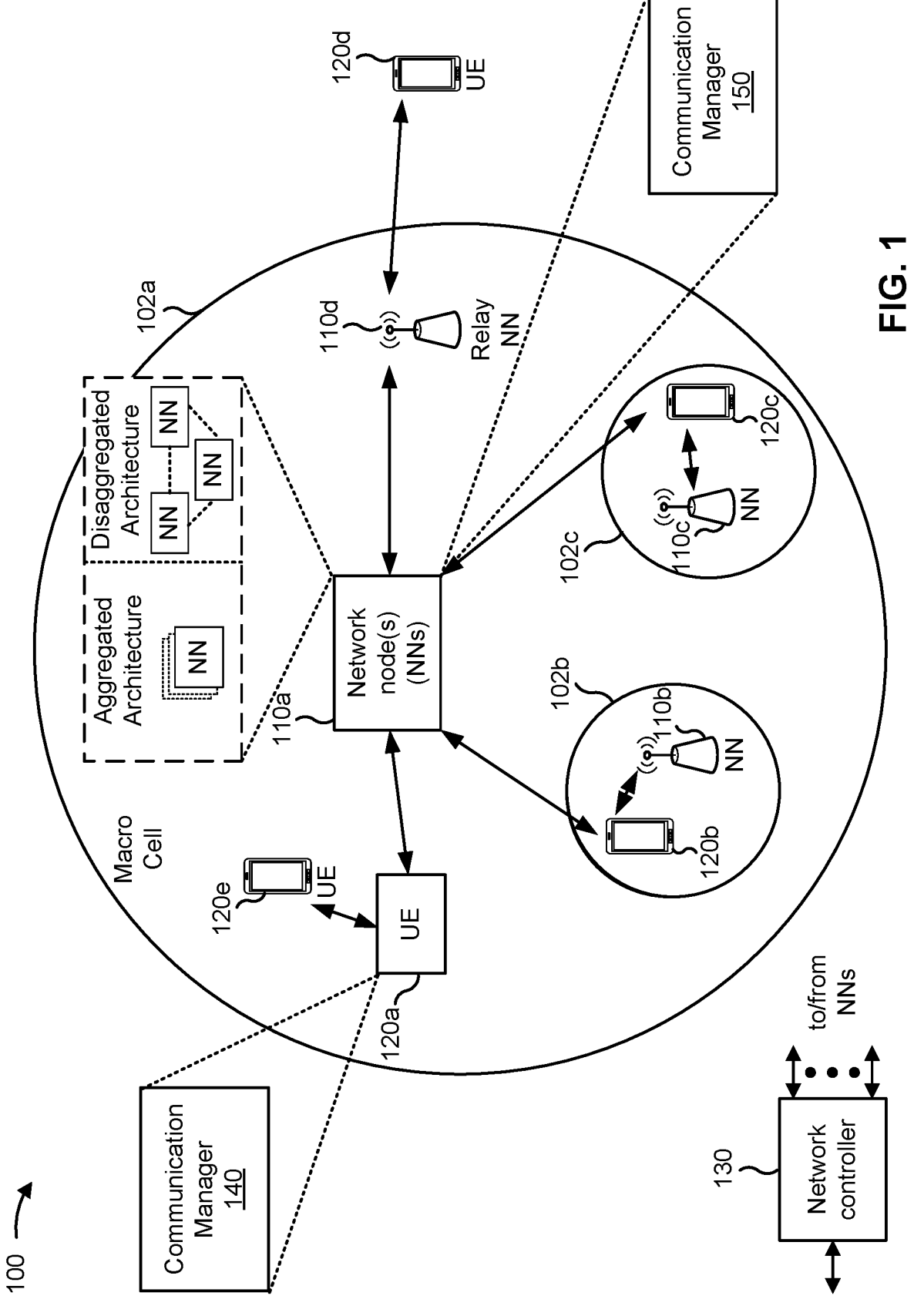
FIG. 1 is a diagram illustrating an example of a wireless network, in accordance with the present disclosure.

Wireless communications exchanged between transmitting devices and receiving devices may be communicated using various waveforms. As wireless communications continue to utilize new frequency bands, viable types of waveforms may need to be selected in order for transmitting devices and receiving devices to effectively communicate with one another. For example, for certain high frequency bands, such as frequency range 4 (FR4) and higher bands, orthogonal frequency domain multiplexing (OFDM) based waveforms may be desirable in order to maintain backwards compatibility with lower frequency bands (e.g., frequency range 1 (FR1), frequency range 2 (FR2), frequency range 2x (FR2x), and similar bands) and/or in order to provide high spectral efficiency in scenarios where an energy efficiency requirement may be relaxed. Additionally, or alternatively, a single carrier waveform may be desirable for scenarios requiring high energy efficiency. For single carrier waveforms, a lower peak-to-average-power ratio (PAPR) may result in a higher power amplifier (PA) efficiency and/or extended battery life of a transmitting device and/or a receiving device. Moreover, single carrier waveforms may achieve a high data rate due to spectrum availability. In such examples, to facilitate frequency domain equalization, a cyclic prefix (CP) and/or a guard interval (GI) (sometimes referred to as a unique word (UW)) may be used to create OFDM-like blocks or symbols. In examples in which multiple waveforms may be used for a certain frequency range (e.g., FR4 or higher bands), slot-level and/or symbol-level alignment between OFDM waveforms and single carrier waveforms may be implemented, and/or a common numerology may be used between OFDM waveforms and single carrier waveforms, such as for a purpose of achieving a uniform transceiver design (e.g., a transceiver including uniform sampling rates and/or fast Fourier transform (FFT) sizes).

A location and/or a configuration of various reference signals exchanged between a transmitting device and a receiving device may differ according to a specific waveform being used for communication. For example, a CP-based OFDM waveform, sometimes referred to as a CP-OFDM waveform, may permit multiplexing of a reference signal (e.g., a demodulation reference signal (DMRS)) with downlink channels (e.g., a physical downlink shared channel (PDSCH), a physical downlink control channel (PDCCH), or a similar channel) in the frequency domain, within a same symbol. In such examples, a DMRS Type 1 configuration and/or a DMRS Type 2 configuration may define different DMRS resource element (RE) densities for a symbol. In such examples, using a cyclic prefix in connection with frequency domain multiplexing of a reference signal and other channels (e.g., PDSCH, PDCCH, or a similar channel) may ensure orthogonality between the reference signal and the other channels. Moreover, channel estimation may be conducted by a device based on the DMRS REs and by frequency-domain interpolation to cover all REs associated with the channel.

For a single carrier waveform with a CP or GI, multiplexing of a reference signal (e.g., DMRS) with other channels in the same symbol (e.g., in the time or frequency domain) may be more difficult, because multiplexing may lead to inter-symbol interference (ISI), such as between a DMRS and a PDSCH. Accordingly, in some examples, in order to avoid interference between a reference signal (e.g., a DMRS) and other channels in the same symbol, multiplexing of a reference signal and another channel may be limited to inter-symbol level. In such examples, a DMRS or similar reference signal may be front-loaded over a half slot or a full slot, such that the DMRS or similar reference signal occupies one or more symbols at the beginning of the half slot or full slot. This may result in high reference signal overhead and otherwise inefficient usage of network resources. For example, for tracking fast time varying channels, such as channels associated with high frequency bands and/or millimeter wave (mmWave) communications, multiple reference signals may need to be received, such as for a purpose of effective channel tracking in high Doppler scenarios. In such examples, allocating multiple symbols to a reference signal (e.g., a DMRS or a similar reference signal) may result in large overhead, reduced throughput, high latency, and overall inefficient usage of network resources.

Some aspects described herein enable frequency domain multiplexing of a data signal and a reference signal using a discrete Fourier transform spread orthogonal frequency domain multiplexing (DFT-s-OFDM) waveform, thus reducing reference signal overhead. In some aspects, a transmitting device (e.g., a user equipment (UE), a network node, or another wireless communication device) may generate a frequency-domain-multiplexed (FDMed) signal, such as by performing frequency domain multiplexing of a data signal (e.g., a PDSCH signal, a physical uplink shared channel (PUSCH) signal, or a similar data signal) and a reference signal (e.g., a DMRS, a sounding reference signal (SRS), a channel state information (CSI) reference signal (CSI-RS), or another reference signal) within a symbol of a DFT-s-OFDM waveform communication, and the transmitting device may transmit the FDMed signal to a receiving device (e.g., a UE, a network node, or another wireless communication device). The receiving device may perform a demapping of the FDMed signal in order to extract the reference signal and the data signal from the FDMed signal. In some aspects, the transmitting device may optimize a density of the reference signal within the FDMed signal, such as for a purpose of striking a balance between overall waveform PAPR and estimation performance at the receiving device, and/or the transmitting device may select a reference signal sequence that strikes a balance between end-to-end performance and reference signal overhead. In this way, aspects described herein may enable robust channel estimation while reducing reference signal overhead as compared to other waveforms requiring full symbol allocations for reference signals, resulting in increased throughput, reduced latency, and overall more efficient usage of network resources.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHZ-7.125 GHZ) and FR2 (24.25 GHZ-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the transmitting device described elsewhere herein may correspond to a network node 110 and/or a UE 120. The transmitting device may include a communication manager 140 (e.g., when the transmitting device corresponds to a UE 120) or a communication manager 150 (e.g., when the transmitting device corresponds to a network node 110). As described in more detail elsewhere herein, the communication manager 140 and/or the communication manager 150 may generate a frequency-domain-multiplexed signal by performing frequency domain multiplexing of a data signal and a reference signal within a symbol of a DFT-s-OFDM waveform communication, the reference signal being one of a demodulation reference signal, a sounding reference signal, or a channel state information reference signal; and transmit, to a receiving device, the frequency-domain-multiplexed signal. Additionally, or alternatively, the communication manager 140 and/or the communication manager 150 may perform one or more other operations described herein.

In some aspects, the receiving device described elsewhere herein may correspond to a network node 110 and/or a UE 120. The receiving device may include a communication manager 140 (e.g., when the receiving device corresponds to a UE 120) or a communication manager 150 (e.g., when the receiving device corresponds to a network node 110). As described in more detail elsewhere herein, the communication manager 140 and/or the communication manager 150 may receive, from a transmitting device, a frequency-domain-multiplexed signal, the frequency-domain-multiplexed signal being associated with frequency domain multiplexing of a data signal and a reference signal within a symbol of a DFT-s-OFDM waveform communication, the reference signal being one of a demodulation reference signal, a sounding reference signal, or a channel state information reference signal; and perform a demapping of the data signal and the reference signal from the frequency-domain-multiplexed signal. Additionally, or alternatively, the communication manager 140 and/or the communication manager 150 may perform one or more other operations described herein.

As indicated above, FIG. 1 is provided as an example. Other examples may differ from what is described with regard to FIG. 1.

Figure 2:
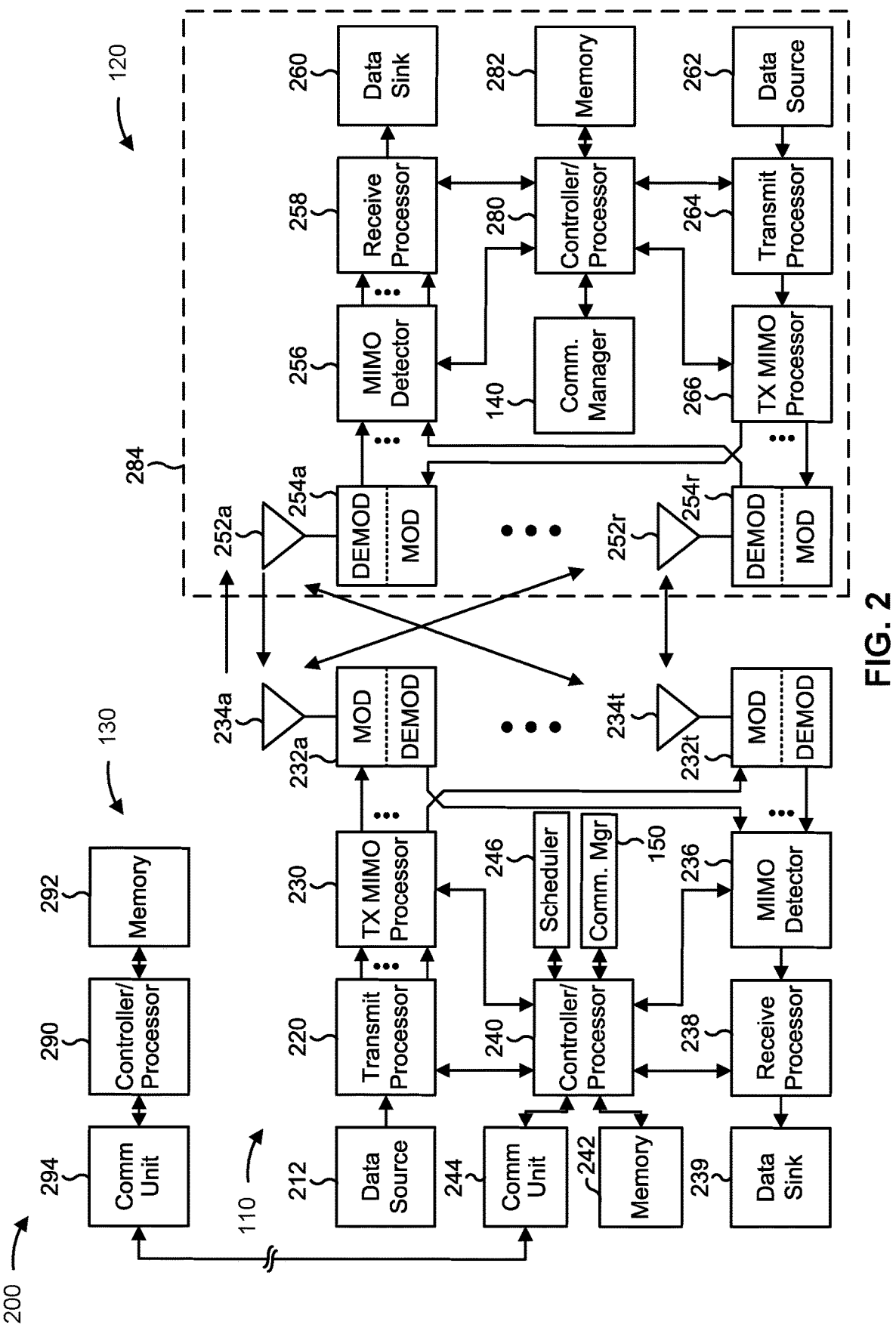
FIG. 2 is a diagram illustrating an example of a network node in communication with a user equipment in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s)

selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-10).

The controller/processor 240 of the network node 110, the controller/processor 280 of the UE 120, and/or any other component(s) of FIG. 2 may perform one or more techniques associated with frequency domain multiplexing of a data signal and a reference signal, as described in more detail elsewhere herein. In some aspects, the transmitting device described herein is the network node 110 or the UE 120, is included in the network node 110 or the UE 120, or includes one or more components of the network node 110 or the UE 120. Similarly, in some aspects, the receiving device described herein is the network node 110 or the UE 120, is included in the network node 110 or UE 120, or includes one or more components of the network node 110 or UE 120. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the transmitting device described elsewhere herein may correspond to the network node 110 or the UE 120 and/or may include means for generating a frequency-domain-multiplexed signal by performing frequency domain multiplexing of a data signal and a reference signal within a symbol of a DFT-s-OFDM waveform communication, the reference signal being one of a demodulation reference signal, a sounding reference signal, or a channel state information reference signal; and/or means for transmitting, to a receiving device, the frequency-domain-multiplexed signal. In some aspects, the means for the transmitting device to perform operations described herein may include, for example, one or more of communication manager 150, transmit processor 220, TX MIMO processor 230, modem 232, antenna 234, MIMO detector 236, receive processor 238, controller/processor 240, memory 242, scheduler 246, communication manager 140, antenna 252, modem 254, MIMO detector 256, receive processor 258, transmit processor 264, TX MIMO processor 266, controller/processor 280, or memory 282.

In some aspects, the receiving device described elsewhere herein may correspond to the network node 110 or the UE 120 and/or may include means for receiving, from a transmitting device, a frequency-domain-multiplexed signal, the frequency-domain-multiplexed signal being associated with frequency domain multiplexing of a data signal and a reference signal within a symbol of a DFT-s-OFDM waveform communication, the reference signal being one of a demodulation reference signal, a sounding reference signal, or a channel state information reference signal; and/or means for demapping the data signal and the reference signal from the frequency-domain-multiplexed signal. In some aspects, the means for the receiving device to perform operations described herein may include, for example, one or more of communication manager 150, transmit processor 220, TX MIMO processor 230, modem 232, antenna 234, MIMO detector 236, receive processor 238, controller/processor 240, memory 242, scheduler 246, communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
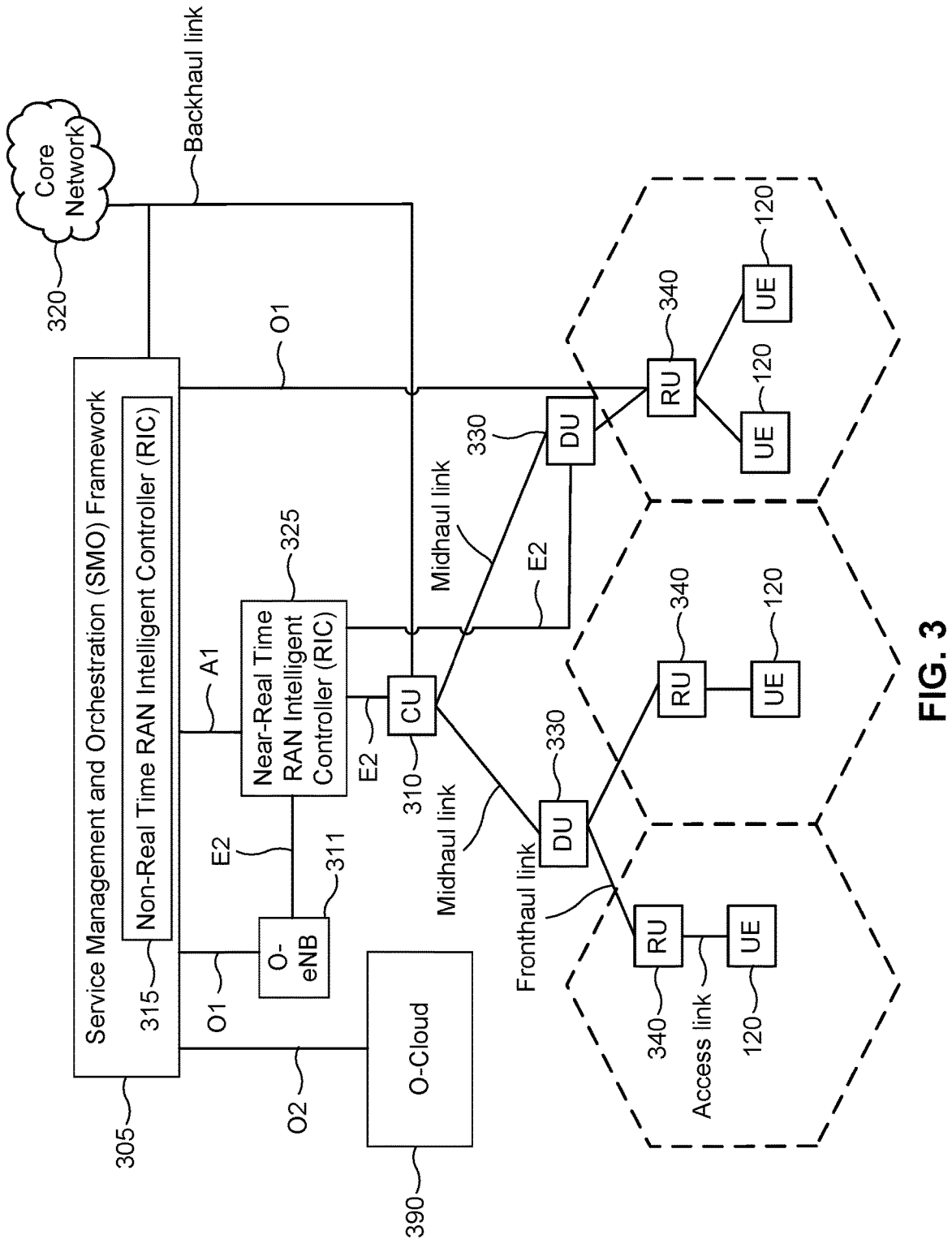
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers May be implemented by one or more modules for forward error correction (FEC) encoding and decoding, scrambling, and modulation and demodulation, among other examples. In some aspects, the DU 330 may further host one or more low PHY layers, such as implemented by one or more modules for a FFT, an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUS 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a PDCCH that carries downlink control information (DCI), a PDSCH that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a PUSH that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a CSI-RS, a DMRS, a positioning reference signal (PRS), or a phase tracking reference signal (PTRS), among other examples. As also shown, an uplink reference signal may include an SRS, a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a CQI, a precoding matrix indicator (PMI), a CSI-RS resource indicator (CRI), a layer indicator (LI), a rank indicator (RI), or an RSRP, among other examples. The network node 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

For certain waveforms, transmitting one or more of the reference signals shown in FIG. 4 may result in high overhead and/or inefficient usage of network resources. For example, for a single carrier waveform with a CP or GI, multiplexing of a reference signal (e.g., DMRS) with other channels in the same symbol (e.g., in the time or frequency domain) may be difficult, because multiplexing may lead to ISI, such as between a DMRS and a PDSCH. Accordingly, in some examples, in order to avoid interference between a reference signal (e.g., a DMRS) and other channels in the same symbol for certain waveforms, multiplexing of a reference signal and another channel may be limited to inter-symbol level. In such examples, a DMRS or similar reference signal may be front-loaded over a half slot or a full slot, such that the DMRS or similar reference signal occupies one or more symbols at the beginning of the half slot or full slot. This may result in high reference signal overhead and otherwise inefficient usage of network resources. For example, for tracking fast time varying channels, such as channels associated with high frequency bands and/or mm Wave communications, multiple reference signals may need to be transmitted throughout a slot, such as for a purpose of effective channel tracking in high Doppler scenarios. In such examples, allocating multiple symbols to a reference signal (e.g., a DMRS or a similar reference signal) may result in large overhead, reduced throughput, high latency, and overall inefficient usage of network resources.

Some techniques and apparatuses described herein enable frequency domain multiplexing of a data signal and a reference signal using a DFT-s-OFDM waveform, thus reducing reference signal overhead in higher band communications or otherwise. In some aspects, a transmitting device (e.g., a UE, a network node, or another wireless communication device) may generate a frequency-domain-multiplexed signal, such as by performing frequency domain multiplexing of a data signal (e.g., a PDSCH signal, a PUSCH signal, or a similar data signal) and a reference signal (e.g., a DMRS, an SRS, a CSI-RS, or another reference signal) within a symbol of a DFT-s-OFDM waveform communication, and the transmitting device may transmit the frequency-domain-multiplexed signal to a receiving device (e.g., a UE, a network node, or another wireless communication device). The receiving device may receive the frequency-domain-multiplexed signal via the DFT-s-OFDM waveform communication and/or may perform a demapping of the data signal and the reference signal from the frequency-domain-multiplexed signal. The transmitting device may optimize a density of the reference signal within the frequency-domain-multiplexed signal, such as for a purpose of striking a balance between overall waveform PAPR and estimation performance at the receiving device, and/or may select a reference signal sequence to strike a balance between end-to-end performance and reference signal overhead. In this way, aspects may enable robust channel estimation while reducing reference signal overhead as compared to other waveforms requiring full symbol allocations for reference signals, resulting in increased throughput, reduced latency, and overall more efficient usage of network resources.

As indicated above, FIG. 4 is provided as an example. Other examples may differ from what is described with regard to FIG. 4.

Figure 5A:
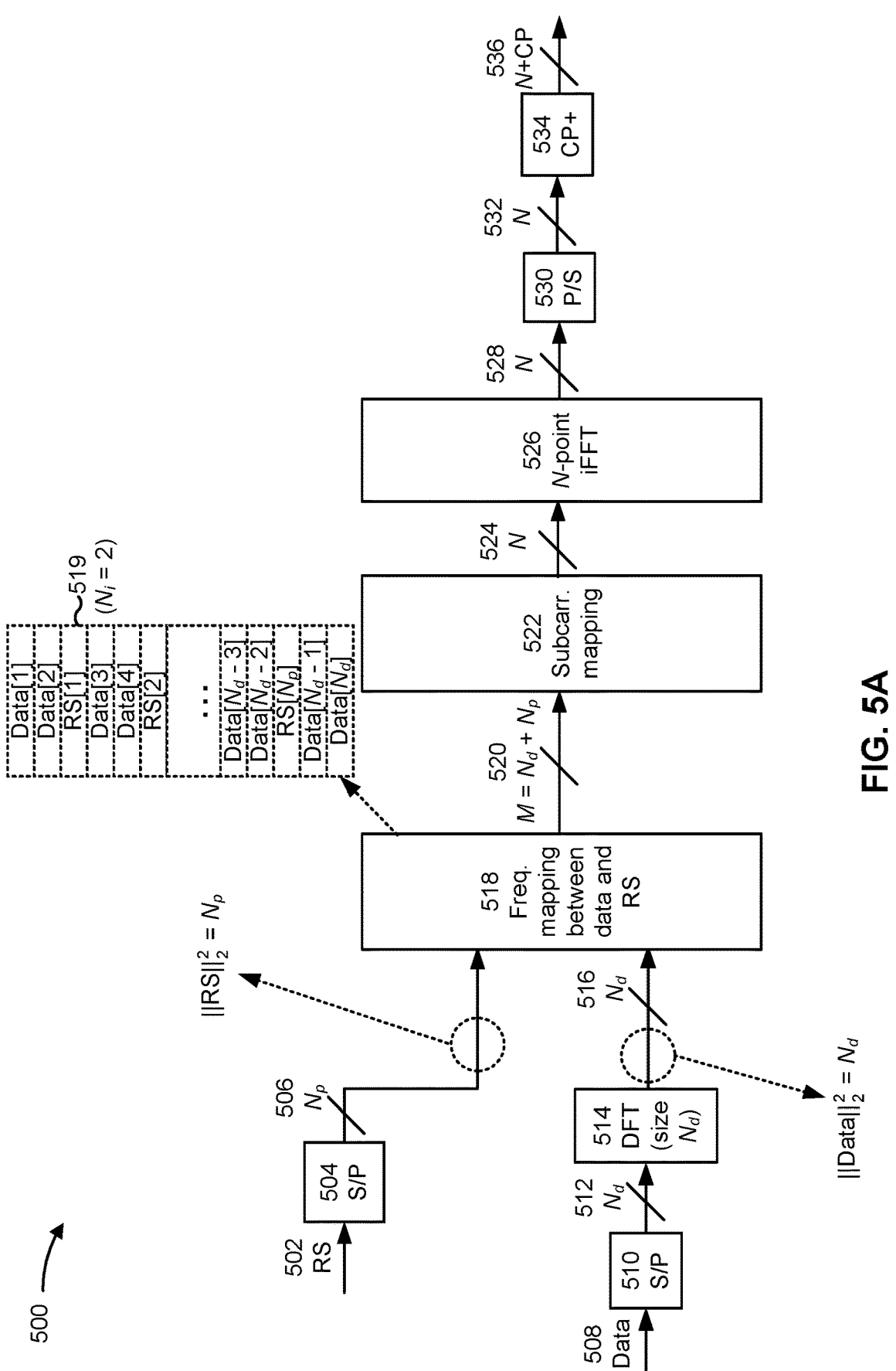
FIGS. 5A-5C are diagrams illustrating an example associated with transmitter and receiver chains for frequency domain multiplexing of a data signal and a reference signal, in accordance with the present disclosure.
Figure 5B:
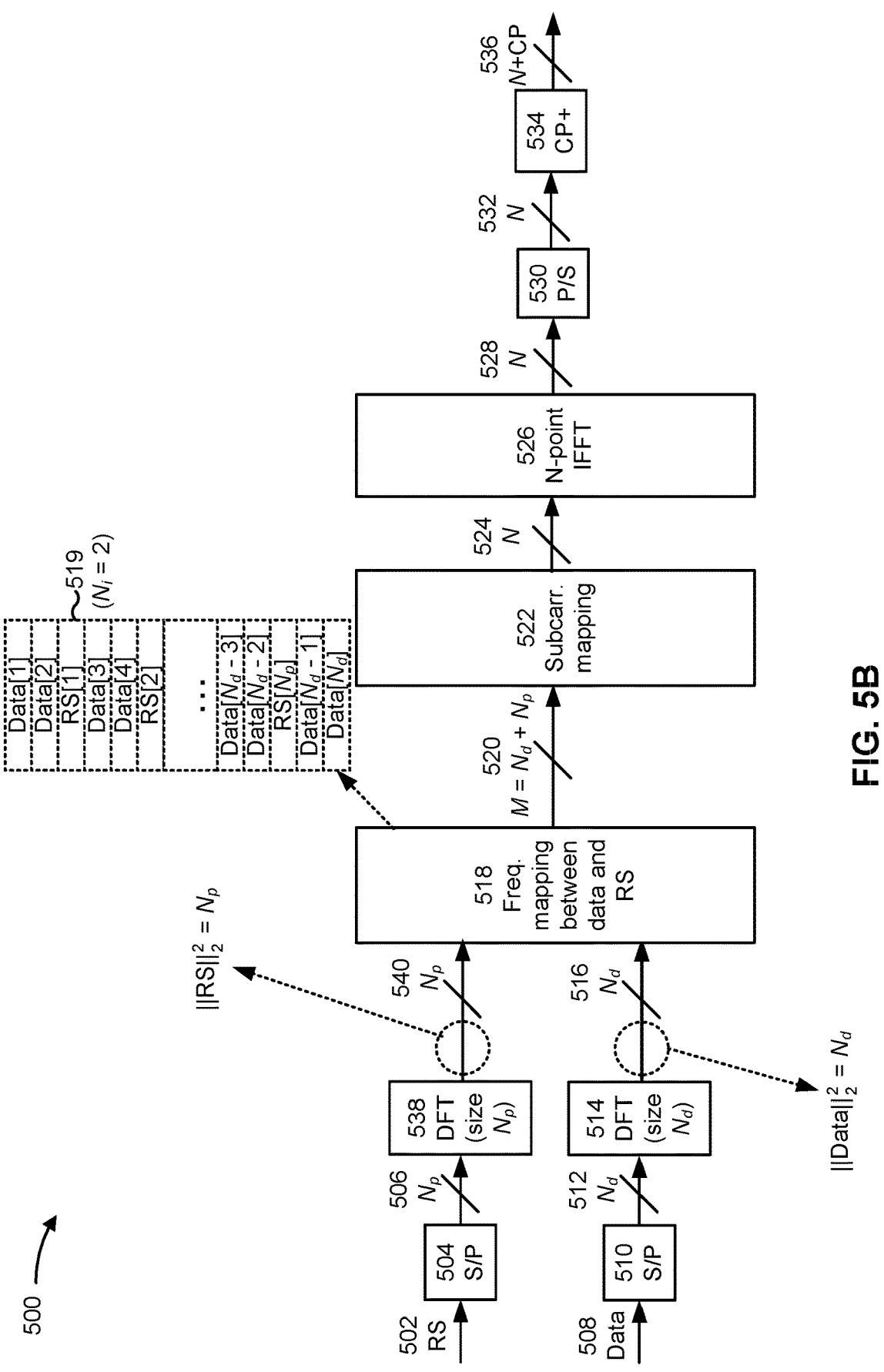
Figure 5C:
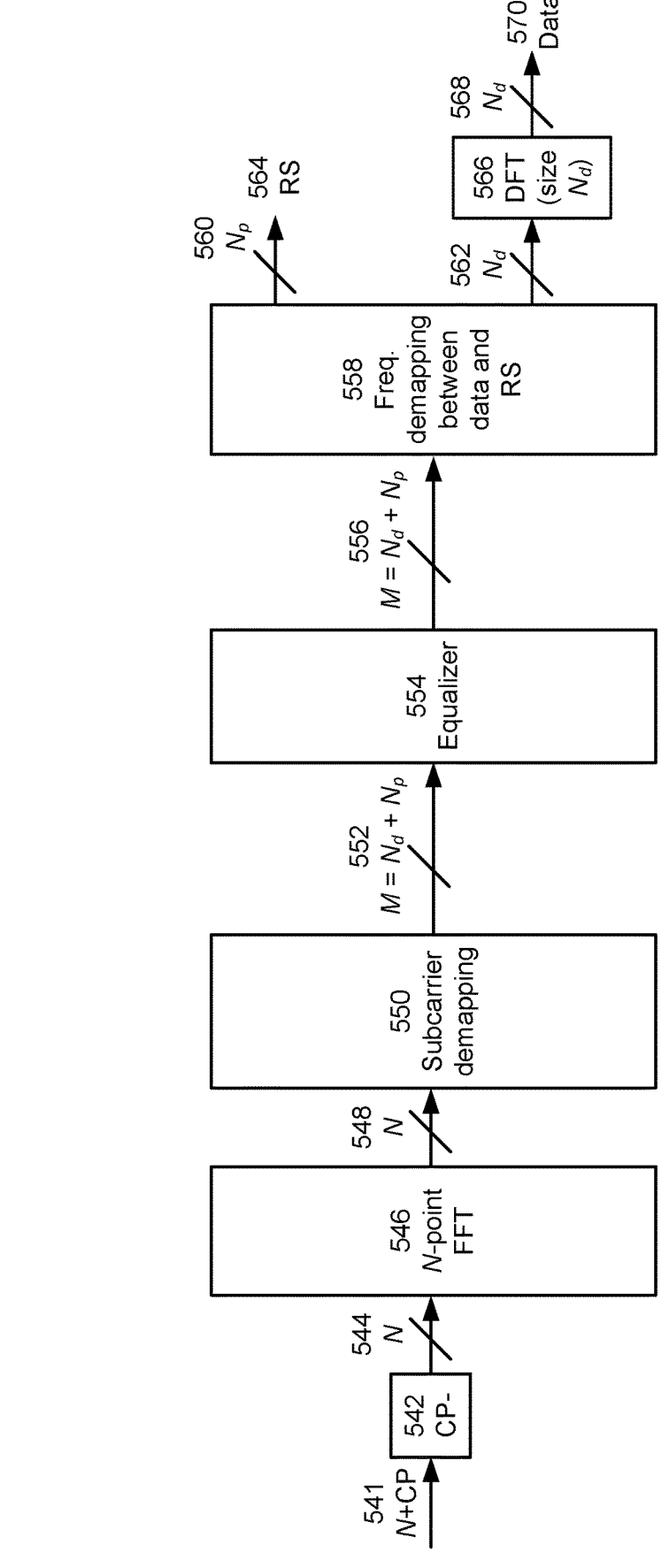

FIGS. 5A-5C are diagrams illustrating an example 500 associated with transmitter and receiver chains for frequency domain multiplexing of a data signal and a reference signal, in accordance with the present disclosure. The example 500 may include communications between a transmitting device (e.g., a network node 110, a UE 120, or another wireless communication device) and a receiving device (e.g., a network node 110, a UE 120, or another wireless communication device). In some aspects, the transmitting device and the receiving device may be included in a wireless network, such as wireless network 100. The transmitting device and the receiving device may communicate via a wireless access link (e.g., when one of the transmitting device and the receiving device is a network node 110 and the other one of the transmitting device and the receiving device is a UE 120), which may include an uplink and a downlink, and/or via a sidelink (e.g., when the transmitting device and the receiving device are both UEs).

In some aspects, a data signal (e.g., a PDSCH signal, a PUSCH signal, or a similar signal) and a reference signal (shown as "RS" in FIGS. 5A-5C, which may be a DMRS, an SRS, a CSI-RS, or a similar reference signal) may be FDMed within a symbol of a DFT-s-OFDM waveform communication, such as for a purpose of reducing overhead associated with certain reference signals and/or enabling tracking of a fast time varying channel, among other purposes. In such aspects, a transmitting device may directly multiplex a reference signal with a DFT-precoded data signal in the frequency domain, or else may multiplex a DFT-precoded reference signal with a DFT-precoded data signal in the frequency domain. For example, FIG. 5A shows an example of a transmitter chain associated with direct frequency domain multiplexing of a reference signal with a DFT-precoded data signal in the frequency domain.

As indicated by reference number 502, the reference signal may be received at the transmitter chain and may be fed to a serial-to-parallel (S/P) converter 504, resulting in a number of samples (sometimes referred to as tones) associated with the reference signal, referred to herein as "$N_p$," and indicated in FIG. 5A by reference number 506. Moreover, as indicated by reference number 508, the data signal may be received at the transmitter chain, and similarly may be fed to an S/P converter 510, resulting in a number of samples associated with the data signal, referred to herein as "$N_d$" and indicated in FIG. 5A by reference number 512. In this example, the data signal may be DFT-precoded by the reference signal may not be DFT-precoded. Accordingly, the data signal samples, $N_d$, may be fed to a DFT precoder 514 having a size corresponding to $N_d$, resulting in $N_d$ DFT-precoded data signal samples, indicated by reference number 516.

The $N_p$ reference signal samples and the $N_d$ DFT-precoded data signal samples may be fed to a frequency mapping component 518 for performing a frequency domain multiplexing of the reference signal samples and the data signal samples, resulting in an FDMed signal. In some aspects, $N_p$ may be less than or equal to $N_d$, such that performing the frequency domain mapping between the reference signal samples and the data signal samples results in one or more data signal samples separating subsequent reference signal samples, in the frequency domain. Put another way, in the FDMed signal, every $N_i+1$ RE, in the frequency domain, may carry a reference signal sample, with the remaining REs carrying data signal samples. For example, in the aspect shown in FIG. 5A, and as indicated by reference number 519, $N_i$ is equal to 2, such that every third RE, in the frequency domain, carries a reference signal sample, with the remaining REs carrying a data signal samples. Thus, for M total REs allocated to a user, every $N_i+1$ RE may correspond to a reference signal sample (with a total quantity of reference signal samples equal to $N_p$), and with the remaining quantity of REs (e.g., M minus $N_p$) corresponding to data signal samples (e.g., $M-N_p=N_d$).

In that regard, as indicated by reference number 520, the signal leaving the frequency mapping component 518 may include M REs, including $N_p$ REs carrying reference signal samples interleaved with $N_d$ data signal samples. The signal (e.g., the M REs) may then be fed to a subcarrier mapping component 522, resulting in N subcarrier mapped REs, as indicated by reference number 524. The N subcarrier mapped REs may be fed to an iFFT component 526 (e.g., an N-point iFFT component) in order to convert the signal from the frequency domain to the time domain, thus resulting in N time domain samples, as indicated by reference number 528. The N time domain samples may then be fed to a parallel-to-serial component 530, resulting in serialized N time domain samples, as indicated by reference number 532. And the serialized signal may be fed to a cyclic prefix component 534 in order to add a cyclic prefix to the signal, as indicated by reference number 536. The signal with cyclic prefix appended thereto may then be wirelessly transmitted to a receiving device, which is described in more detail below in connection with FIG. 5C.

FIG. 5B shows an alternative example of a transmitter chain in which a DFT-precoded reference signal is FDMed with a DFT-precoded data signal. In this example, the $N_p$ samples leaving the S/P converter 504, described above in connection with reference number 506, may be fed to a DFT precoder 538 having a size corresponding to $N_p$, resulting in $N_p$ DFT-precoded data signal samples, indicated by reference number 540. The $N_p$ DFT-precoded reference signal samples and the $N_d$ DFT-precoded data signal samples may be fed to the frequency mapping component 518 for performing a frequency domain multiplexing of the reference signal samples and the data signal samples, resulting in an FDMed signal, as described above in connection with FIG. 5A. The remaining operations of the transmitter chain shown in FIG. 5B may be performed in a substantially similar manner as described above in connection with the transmitter chain shown in FIG. 5A. In some aspects, performing DFT precoding for both the reference signal samples and the data signal samples may result in certain PAPR advantages, which are described in more detail below.

FIG. 5C shows an example of a receiver chain associated with demapping an FDMed signal associated with a DFT-s-OFDM waveform communication, such as an FDMed signal generated using one of the transmitter chains described above in connection with FIGS. 5A and 5C. As indicated by reference number 541, a receiving device may receive the signal generated by a transmitting device, such as the CP-based signal described above in connection with reference number 536. The signal may be fed to a CP component 542, which in this instance may strip the CP from the signal, resulting in a signal associated with N subcarrier mapped samples, as indicated by reference number 544. The signal may be fed to an FFT component 546 (e.g., an N-point FFT component) in order to convert the signal from the time domain to the frequency domain, resulting in N frequency domain samples, as indicated by reference number 548. The N frequency domain samples may be fed to a subcarrier demapping component 550, which may be capable of demapping the N frequency domain samples from the corresponding subcarriers, resulting in the M samples, as indicated by reference number 552 (e.g., the $N_d$ plus $N_p$ samples described above in connection with the frequency mapping component 518). The M samples may be fed to an equalizer component 554 in order to undergo an equalization process (e.g., a process used to reduce or eliminate ISI prior to symbol detection), resulting in M equalized samples, indicated by reference number 556.

The M equalized samples may be fed to a frequency demapping component 558, which perform demapping of the reference signal samples (e.g., $N_p$, as indicated by reference number 560) and the data signal samples (e.g., $N_d$, as indicated by reference number 562). Put another way, the receiving device may be capable of demapping the interleaved reference signal samples from the surrounding data signal samples, thereby resulting in two coherent signals (e.g., a reference signal, as indicated by reference number 564, and a data signal, described below in connection with reference number 570). The receiving device may then perform channel estimation or a similar procedure using the reference signal. Moreover, the receiving device may perform additional processing on the data signal samples (e.g., Na), such as by feeding the data signal samples to a DFT component 566 (e.g., a DFT component having a size corresponding to Na), resulting in $N_d$ DFT-processed samples, indicated by reference number 568, from which the receiving device may retrieve the data signal, as indicated by reference number 570.

In some aspects, frequency domain multiplexing a reference signal with a data signal in this manner may result in reduced reference signal overhead while permitting tracking of fast time-varying channels and other communication benefits with little or no adverse effect on a PAPR of a data signal. For example, in some aspects, for a data signal associated with QPSK that is FDMed with a Zadoff-Chu (ZC) sequence (root 1) DMRS, a 50% DMRS density (e.g., $N_i=1$) may exhibit an almost identical PAPR performance as compared to a data-only signal at a $10^{-3}$ complementary cumulative distribution function (CCDF) point, a 33% DMRS density (e.g., $N_i=2$) may exhibit an approximately 1 decibel (dB) loss in PAPR as compared to a data-only signal at a $10^{-3}$ CCDF point, a 25% DMRS density (e.g., $N_i=3$) may exhibit an approximately 1.2 dB loss in PAPR as compared to a data-only signal at a $10^{-3}$ CCDF point, and a 15% DMRS density may exhibit an approximately 1.55 dB loss in PAPR as compared to a data-only signal at a $10^{-3}$ CCDF point. In some other aspects, for a data signal associated with 16 quadrature amplitude modulation (QAM) that is FDMed with a ZC sequence (root 1) DMRS, a 50% DMRS density (e.g., $N_i=1$) may exhibit a better PAPR performance (e.g., an approximately 0.4 dB gain in PAPR) as compared to a data-only signal at a $10^{-3}$ CCDF point, a 33% DMRS density (e.g., $N_i=2$) may exhibit an approximately 0.5 dB loss in PAPR as compared to a data-only signal at a $10^{-3}$ CCDF point, a 25% DMRS density (e.g., $N_i=3$) may exhibit an approximately 0.6 dB loss in PAPR as compared to a data-only signal at a $10^{-3}$ CCDF point, and a 15% DMRS density may exhibit an approximately 1.03 dB loss in PAPR as compared to a data-only signal at a $10^{-3}$ CCDF point.

In some other aspects, for a data signal associated with 256 QAM that is FDMed with a ZC sequence (root 1) DMRS, a 50% DMRS density (e.g., $N_i=1$) may exhibit a better PAPR performance (e.g., an approximately 0.52 dB gain in PAPR) as compared to a data-only signal at a $10^{-3}$ CCDF point, a 33% DMRS density (e.g., $N_i=2$) may exhibit an approximately 0.37 dB loss in PAPR as compared to a data-only signal at a $10^{-3}$ CCDF point, a 25% DMRS density (e.g., $N_i=3$) may exhibit an approximately 0.45 dB loss in PAPR as compared to a data-only signal at a $10^{-3}$ CCDF point, and a 15% DMRS density may exhibit an approximately 1.1 dB loss in PAPR as compared to a data-only signal at a $10^{-3}$ CCDF point. In some other aspects, for a data signal associated with 16 QAM that is FDMed with a w/2 binary phase-shift keying (BPSK) DMRS (e.g., $\pi/2$ BPSK with frequency-domain spectral shaping (FDSS)), a 50% DMRS density (e.g., $N_i=1$) may exhibit a better PAPR performance (e.g., an approximately 0.35 dB gain in PAPR) as compared to a data-only signal at a $10^{-3}$ CCDF point, a 33% DMRS density (e.g., $N_i=2$) may exhibit an approximately 0.6 dB loss in PAPR as compared to a data-only signal at a $10^{-3}$ CCDF point, and a 25% DMRS density (e.g., $N_i=3$) may exhibit an approximately 0.85 dB loss in PAPR as compared to a data-only signal at a $10^{-3}$ CCDF point.

In that regard, with $N_i=1$ (e.g., a 50% reference signal density) and QPSK modulation, the PAPR of a data signal may be only slightly better than a PAPR of an FDMed data signal and a ZC sequence DMRS. Moreover, for $N_i=1$ and 64 QAM modulation, a PAPR of a data-only signal may actually be worse than a PAPR of an FDMed data signal and a ZC sequence DMRS. This may be because, is some aspects, $$PAPR = \frac{\max_{t \in T} |x(t)|^2}{\mathbb{E}\{|x(t)|^2\}}.$$

Accordingly, for a reference signal density of 50% (e.g., $N_i=1$), and considering that an average power of a data signal and a DMRS may be the same, a total average power may be doubled, but a peak power may not necessarily be doubled, particularly for high order modulations such as 64 QAM and 256 QAM. This may be because a ZC sequence DMRS has a low PAPR, and thus, when added to a high PAPR waveform, the ZC sequence DMRS may not heavily affect the peak values but may change the average power for high densities.

Accordingly, a trade-off may exist in terms of PAPR performance between the density of low PAPR waveform for DMRS and high PAPR for a data signal. Additionally, or alternatively, when frequency domain multiplexing a reference signal with a data signal, a density of a reference signal, in the frequency domain, and/or a type of reference signal sequence used may impact overall PAPR. Accordingly, in some aspects, a transmitting device may select a reference signal density, sequence, or other characteristics in an effort to optimize a reduction in reference signal overhead while maintaining an integrity of an estimated channel and/or overall PAPR performance. Aspects of transmitting device selecting one or more reference signal attributes and/or frequency domain multiplexing a reference signal with a data signal are described in more detail below in connection with FIG. 6.

As indicated above, FIGS. 5A-5C are provided as an example. Other examples may differ from what is described with respect to FIGS. 5A-5C.

Figure 6:
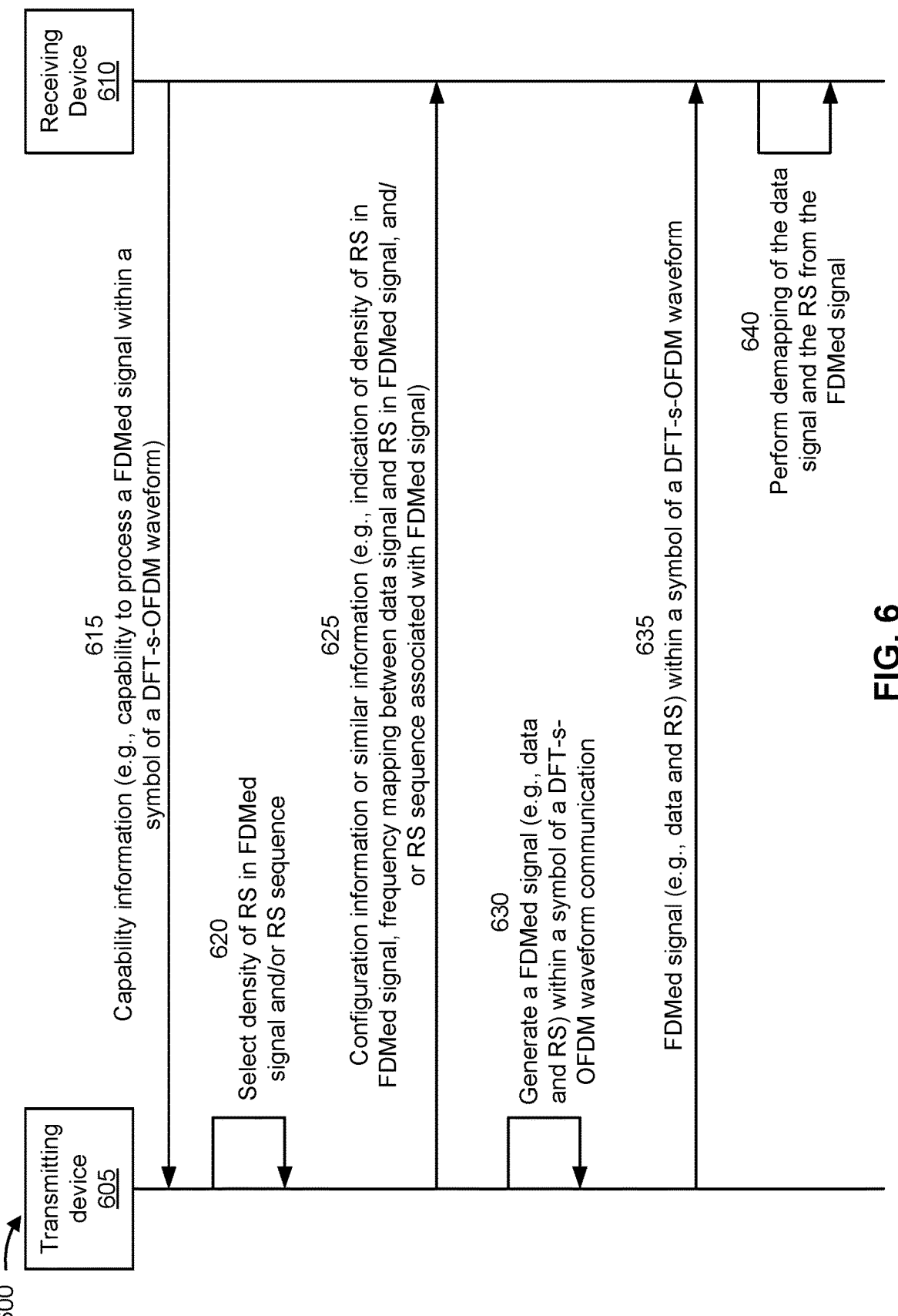
FIG. 6 is a diagram of an example associated with frequency domain multiplexing of a data signal and a reference signal, in accordance with the present disclosure.

FIG. 6 is a diagram of an example 600 associated with frequency domain multiplexing of a data signal and a reference signal, in accordance with the present disclosure. As shown in FIG. 6, a transmitting device 605 (e.g., a network node 110, such as a CU, a DU, and/or an RU; a UE 120; or another wireless communication device) may communicate with a receiving device 610 (e.g., a network node 110, such as a CU, a DU, and/or an RU; a UE 120; or another wireless communication device). In some aspects, the transmitting device 605 and the receiving device 610 may be part of a wireless network (e.g., wireless network 100). The transmitting device 605 and the receiving device 610 may have established a wireless connection prior to operations shown in FIG. 6. In some aspects, the transmitting device 605 and the receiving device 610 may communicate via a high frequency band, such as FR4 or a higher band.

As indicated by reference number 615, the receiving device 610 may transmit, and the transmitting device 605 may receive, capability information (e.g., a capabilities report). In some aspects, the capability information may indicate a capability of the receiving device 610 to process an FDMed signal that is associated with a DFT-s-OFDM waveform (e.g., a signal that includes a reference signal and a data signal FDMed in a symbol of an DFT-s-OFDM communication). For example, in some aspects, the receiving device 610 may correspond to a UE 120, and the transmitting device 605 may correspond to a network node 110. In such aspects, the UE 120 may indicate, to the network node 110 (e.g., via a capabilities report) the UE 120's capability to process an FDMed reference signal and data signal.

As indicated by reference number 620, based at least in part on the receiving device 610 having a capability to process an FDMed reference signal and data signal, the transmitting device may select certain parameters for an FDMed communication (e.g., a DFT-s-OFDM waveform communication that is used to transmit an FDMed reference signal and data signal). For example, in some aspects, the transmitting device 605 may select a density of the reference signal within the FDMed signal, such as by selecting an $N_i$ parameter for the FDMed signal. Additionally, or alternatively, the transmitting device 605 may select an optimal reference signal density in order to strike a balance between an overall waveform PAPR and a channel estimation performance at the receiving device 610, such as when a DMRS is being FDMed with a data signal.

Additionally, or alternatively, the transmitting device 605 may select a reference signal sequence associated with the FDMed signal. For example, in some aspects, the transmitting device 605 may select a reference signal sequence that strikes a balance between end-to-end performance and reference signal overhead. More particularly, in some aspects a $\pi/2$ BPSK with FDSS sequence may result in channel estimation performance loss at low signal to noise ratio (SNR) points because, with FDSS, a spectrum associated with a reference signal is no longer flat. Accordingly, the transmitting device 605 may determine whether to use $\pi/2$ BPSK, with or without FDSS, or whether to use a different reference signal sequence, for a given FDMed signal. In some aspects, the transmitting device 605 may select one of the reference signal sequences described above in connection with FIGS. 5A-5C, such as a ZC sequence, a $\pi/2$ BPSK without FDSS, a $\pi/2$ BPSK with FDSS, or a similar reference signal sequence.

In some aspects, the transmitting device 605 may select a density of a reference signal within the FDMed signal and/or a reference signal sequence based at least in part on an MCS associated with the FDMed signal (e.g., an MCS used for the data signal transmission, such as one of QPSK, 16 QAM, 256 QAM, or the like). For example, as described above in connection with FIGS. 5A-5C, higher a modulation order may result in lower loss in PAPR for low density reference signals in an FDMed signal. Accordingly, a selected reference signal density may be higher for low modulation orders (e.g., a selected $N_i$ may be relatively small for low modulation orders, such as 1 or 2, resulting in densities of 50% or 33%, respectively), and a selected reference signal density may be lower for high modulation orders (e.g., a selected $N_i$ may be relatively large for high modulation orders, such as 3 or more, resulting in densities of 25% or smaller).

In some aspects, the transmitting device 605 may select a reference signal sequence to be used and/or a density of the reference signal within the FDMed signal based at least in part on a number of transmission layers (e.g., a transmission rank of the communication). For example, in higher-rank MIMO communications, a precoder may be used by the transmitting device 605, and thus a selection of a reference signal sequence and/or the density of the reference signal in the frequency domain may be dependent on transmission rank. More particularly, for line of sight (LoS) MIMO channels, a precoder used for the MIMO transmission may be diagonal, and thus the transmitting device may select a reference signal sequence and/or a density of the reference signal based on similar considerations as for rank one transmissions. However, for non-LoS MIMO channels, a selection of a reference signal sequence and/or a density of the reference signal may be dependent on the specific precoder matrix used for the MIMO transmission.

As shown by reference number 625, the transmitting device 605 may transmit, and the receiving device 610 may receive, configuration information or similar information that includes one or more indications about a FDMed signal to be transmitted via a DFT-s-OFDM waveform. In some aspects, the receiving device 610 may receive the configuration information or similar information via one or more of RRC signaling, one or more MAC control elements (MAC-CEs), DCI, and/or UCI, among other examples. In some aspects, the configuration information or similar information may include an indication of one or more configuration parameters (e.g., already known to the receiving device 610 and/or previously indicated by the transmitting device 605 or other network device) for selection by the receiving device 610, and/or explicit configuration information for the receiving device 610 to use to configure the receiving device 610, among other examples.

In some aspects, the configuration information or similar information may indicate a density of the reference signal within the FDMed signal (e.g., as selected via the operations described above in connection with reference number 620). For example, the configuration information or similar information may explicitly indicate the reference signal density or else may indicate a parameter indicative of the reference signal density, such as the $N_i$ parameter described above in connection with FIGS. 5A-5C. Additionally, or alternatively, the configuration information or similar information may indicate a frequency mapping between the data signal and the reference signal in the FDMed signal. Such information may be helpful for demapping the reference signal and/or the data signal from the FDMed signal, which is described in more detail below in connection with reference number 640. Additionally, or alternatively, the configuration information or similar information may indicate a selected reference signal sequence associated with the FDMed signal. For example, the configuration information may indicate that the reference signal will be associated with one of a ZC sequence, a $\pi/2$ BPSK sequence with or without FDSS, or another reference signal sequence.

As shown by reference number 630, based at least in part on one or more selected parameters (such as the one or more parameters described above in connection with reference numbers 620 and 625), the transmitting device 605 may generate an FDMed signal by performing frequency domain multiplexing of a data signal and a reference signal within a symbol of a DFT-s-OFDM waveform communication. In some aspects, the reference signal may be one of a DMRS, an SRS, a CSI-RS, or a similar reference signal. Additionally, or alternatively, the data signal may be associated with one of a PDSCH, a PUSCH, or a similar channel. In some aspects, the DFT-s-OFDM waveform communication may be associated with a high SNR operating point, such as a communication associated with a high modulation order. For high SNR operating points, a channel estimation SNR may be relatively high, and thus reducing overhead of a reference signal (e.g., DMRS) in the frequency domain for a DFT-s-OFDM waveform communication may not adversely affect end-to-end performance. Additionally, or alternatively, the DFT-s-OFDM waveform communication may be associated with fast time-varying channels, and thus frequency domain multiplexing the data signal and the reference signal (e.g., DMRS) may result in a good tradeoff between reference signal overhead and error performance.

As described above in connection with FIGS. 5A and 5B, in some aspects a reference signal to be frequency domain multiplexed with a data signal may be DFT-precoded, while, in some other aspects, a reference signal to be frequency domain multiplexed with a data signal may not be DFT-precoded (e.g., a non-DFT-precoded reference signal may be directly multiplexed with a DFT-precoded data signal). Put another way, in some aspects, the data signal in the FDMed signal is DFT-precoded and the reference signal in the FDMed signal is not DFT-precoded, while, in some other aspects, the data signal and the reference signal in the FDMed signal are DFT-precoded.

Additionally, or alternatively, in aspects in which the receiving device 610 transmitted capability information (e.g., a capabilities report) to the transmitting device 605, the operations shown and described in connection with reference number 630 (e.g., the transmitting device 605 generating the FDMed signal) may be based at least in part on the capability information. Moreover, the operations shown and described in connection with reference number 630 May include performing one or more of the other operations described above in connection with FIGS. 5A and 5B, such as, in addition to DFT precoding one or both of the reference signal and the data signal, performing frequency mapping between the data signal and the reference signal, performing subcarrier mapping, performing an iFFT operation, or performing additional transmitter chain operations. As indicated by reference number 635, the transmitting device 605 may transmit, and the receiving device 610 may receive, the FDMed signal (e.g., a DFT-s-OFDM waveform communication including the FDMed signal).

As indicated by reference number 640, upon receiving the FDMed signal (e.g., upon receiving a DFT-s-OFDM waveform communication including the FDMed signal), the receiving device 610 may perform a demapping of the data signal and the reference signal from the FDMed signal. For example, the receiving device may perform one or more of the operations described above in connection with the demapping component in FIG. 5C. Moreover, the operations shown and described in connection with reference number 640 may include performing one or more of the other operations described above in connection with 5C, such as, in addition to performing demapping of the data signal and the reference signal from the FDMed signal, performing an FFT operation, performing a subcarrier demapping operation, performing an equalization operation, or performing additional receiver chain operations.

Based at least in part on the transmitting device 605 and the receiving device 610 communicating using a DFT-s-OFDM waveform communication that includes an FDMed data signal and reference signal, the transmitting device 605 and/or the receiving device 610 may conserve computing, power, network, and/or communication resources that may have otherwise been consumed traditional reference signal procedures. For example, based at least in part on the transmitting device 605 and the receiving device 610 communicating using a DFT-s-OFDM waveform communication that includes an FDMed data signal and reference signal, the transmitting device 605 and the receiving device 610 may improve channel estimation and thus communicate with a reduced error rate, which may conserve computing, power, network, and/or communication resources that may have otherwise been consumed to detect and/or correct communication errors, and/or may communicate using a reduced reference signal overhead, which may increase throughput, reduce latency, and otherwise result in more efficient usage of network resources.

As indicated above, FIG. 6 is provided as an example. Other examples may differ from what is described with respect to FIG. 6.

FIG. 7 is a diagram illustrating an example process 700 performed, for example, by a transmitting device, in accordance with the present disclosure. Example process 700 is an example where the transmitting device (e.g., transmitting device 605) performs operations associated with frequency domain multiplexing of a data signal and a reference signal.

As shown in FIG. 7, in some aspects, process 700 may include generating a frequency-domain-multiplexed signal by performing frequency domain multiplexing of a data signal and a reference signal within a symbol of a DFT-s-OFDM waveform communication, the reference signal being one of a demodulation reference signal, a sounding reference signal, or a channel state information reference signal (block 710). For example, the transmitting device (e.g., using communication manager 906, depicted in FIG. 9) may generate a frequency-domain-multiplexed signal by performing frequency domain multiplexing of a data signal and a reference signal within a symbol of a DFT-s-OFDM waveform communication, the reference signal being one of a demodulation reference signal, a sounding reference signal, or a channel state information reference signal, as described above.

As further shown in FIG. 7, in some aspects, process 700 may include transmitting, to a receiving device, the frequency-domain-multiplexed signal (block 720). For example, the transmitting device (e.g., using transmission component 904 and/or communication manager 906, depicted in FIG. 9) may transmit, to a receiving device, the frequency-domain-multiplexed signal, as described above.

Process 700 may include additional aspects, such as any single aspect or any combination of aspects described below and/or in connection with one or more other processes described elsewhere herein.

In a first aspect, one of the transmitting device or the receiving device is a user equipment, and the other one of the transmitting device or the receiving device is a network node.

In a second aspect, alone or in combination with the first aspect, the transmitting device is a first UE, and the receiving device is a second UE.

In a third aspect, alone or in combination with one or more of the first and second aspects, the data signal is associated with one of a physical downlink shared channel or a physical uplink shared channel.

In a fourth aspect, alone or in combination with one or more of the first through third aspects, the data signal is DFT-precoded and the reference signal is not DFT-precoded.

In a fifth aspect, alone or in combination with one or more of the first through fourth aspects, the data signal and the reference signal are DFT-precoded.

In a sixth aspect, alone or in combination with one or more of the first through fifth aspects, process 700 includes selecting a density of the reference signal within the frequency-domain-multiplexed signal.

In a seventh aspect, alone or in combination with one or more of the first through sixth aspects, process 700 includes transmitting, to the receiving device, an indication of a density of the reference signal within the frequency-domain-multiplexed signal.

In an eighth aspect, alone or in combination with one or more of the first through seventh aspects, process 700 includes transmitting, to the receiving device, an indication of a frequency mapping between the data signal and the reference signal in the frequency-domain-multiplexed signal.

In a ninth aspect, alone or in combination with one or more of the first through eighth aspects, process 700 includes selecting a reference signal sequence associated with the frequency-domain-multiplexed signal.

In a tenth aspect, alone or in combination with one or more of the first through ninth aspects, process 700 includes transmitting, to the receiving device, an indication of a selected reference signal sequence associated with the frequency-domain-multiplexed signal.

In an eleventh aspect, alone or in combination with one or more of the first through tenth aspects, process 700 includes receiving, from the receiving device, capability information indicating a capability of the receiving device to process the frequency-domain-multiplexed signal, wherein generating the frequency-domain-multiplexed signal is based at least in part on the capability information.

In a twelfth aspect, alone or in combination with one or more of the first through eleventh aspects, process 700 includes selecting at least one of a density of the reference signal within the frequency-domain-multiplexed signal or a reference signal sequence associated with the frequency-domain-multiplexed signal based at least in part on a modulation and coding scheme associated with the frequency-domain-multiplexed signal.

In a thirteenth aspect, alone or in combination with one or more of the first through twelfth aspects, the frequency-domain-multiplexed signal is associated with a multiple input multiple output communication having a transmission rank, and the process 700 includes selecting at least one of a density of the reference signal within the frequency-domain-multiplexed signal or a reference signal sequence associated with the frequency-domain-multiplexed signal based at least in part on the transmission rank.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a receiving device, in accordance with the present disclosure. Example process 800 is an example where the receiving device (e.g., receiving device 610) performs operations associated with frequency domain multiplexing of a data signal and a reference signal.

As shown in FIG. 8, in some aspects, process 800 may include receiving, from a transmitting device, a frequency-domain-multiplexed signal, the frequency-domain-multiplexed signal being associated with frequency domain multiplexing of a data signal and a reference signal within a symbol of a DFT-s-OFDM waveform communication, the reference signal being one of a demodulation reference signal, a sounding reference signal, or a channel state information reference signal (block 810). For example, the receiving device (e.g., using reception component 1002 and/or communication manager 1006, depicted in FIG. 10) may receive, from a transmitting device, a frequency-domain-multiplexed signal, the frequency-domain-multiplexed signal being associated with frequency domain multiplexing of a data signal and a reference signal within a symbol of a DFT-s-OFDM waveform communication, the reference signal being one of a demodulation reference signal, a sounding reference signal, or a channel state information reference signal, as described above.

As further shown in FIG. 8, in some aspects, process 800 may include performing demapping of the data signal and the reference signal from the frequency-domain-multiplexed signal (block 820). For example, the receiving device (e.g., using communication manager 1006, depicted in FIG. 10) may perform demapping of the data signal and the reference signal from the frequency-domain-multiplexed signal, as described above.

Process 800 may include additional aspects, such as any single aspect or any combination of aspects described below and/or in connection with one or more other processes described elsewhere herein.

In a first aspect, one of the transmitting device or the receiving device is a user equipment, and the other one of the transmitting device or the receiving device is a network node.

In a second aspect, alone or in combination with the first aspect, the transmitting device is a first UE, and the receiving device is a second UE.

In a third aspect, alone or in combination with one or more of the first and second aspects, the data signal is associated with one of a physical downlink shared channel or a physical uplink shared channel.

In a fourth aspect, alone or in combination with one or more of the first through third aspects, the data signal is DFT-precoded and the reference signal is not DFT-precoded.

In a fifth aspect, alone or in combination with one or more of the first through fourth aspects, the data signal and the reference signal are DFT-precoded.

In a sixth aspect, alone or in combination with one or more of the first through fifth aspects, process 800 includes receiving, from the transmitting device, an indication of a density of the reference signal within the frequency-domain-multiplexed signal, wherein demapping the data signal and the reference signal from the frequency-domain-multiplexed signal is based at least in part on the indication of the density of the reference signal within the frequency-domain-multiplexed signal.

In a seventh aspect, alone or in combination with one or more of the first through sixth aspects, process 800 includes receiving, from the transmitting device, an indication of a frequency mapping between the data signal and the reference signal in the frequency-domain-multiplexed signal, wherein demapping the data signal and the reference signal from the frequency-domain-multiplexed signal is based at least in part on the indication of the frequency mapping between the data signal and the reference signal in the frequency-domain-multiplexed signal.

In an eighth aspect, alone or in combination with one or more of the first through seventh aspects, process 800 includes receiving, from the transmitting device, an indication of a selected reference signal sequence associated with the frequency-domain-multiplexed signal, wherein demapping the data signal and the reference signal from the frequency-domain-multiplexed signal is based at least in part on the indication of the selected reference signal sequence associated with the frequency-domain-multiplexed signal.

In a ninth aspect, alone or in combination with one or more of the first through eighth aspects, process 800 includes transmitting, to the transmitting device, capability information indicating a capability of the receiving device to process the frequency-domain-multiplexed signal, wherein receiving the frequency-domain-multiplexed signal is based at least in part on the capability information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
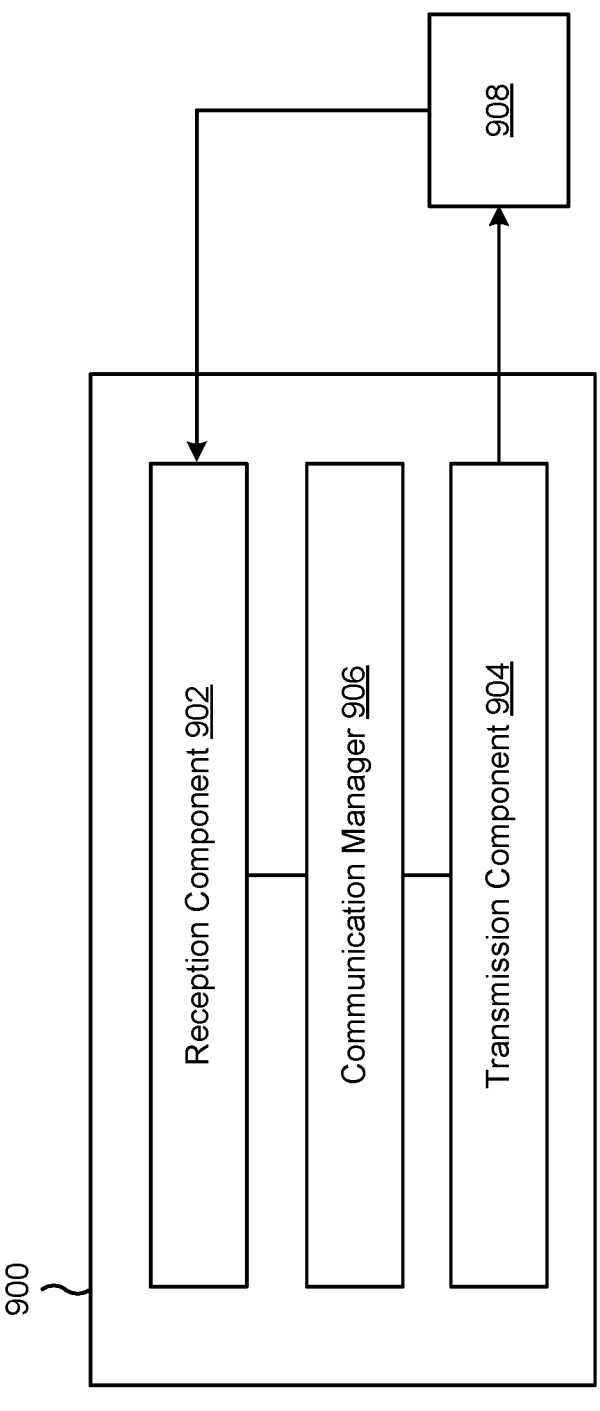
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a transmitting device (e.g., transmitting device 605), or a transmitting device may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 or the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 5A-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node 110 or UE 120 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node 110 or the UE 120 described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the network node 110 or the UE 120 described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The communication manager 906 may generate a frequency-domain-multiplexed signal by performing frequency domain multiplexing of a data signal and a reference signal within a symbol of a DFT-s-OFDM waveform communication, the reference signal being one of a demodulation reference signal, a sounding reference signal, or a channel state information reference signal. The transmission component 904 may transmit, to a receiving device, the frequency-domain-multiplexed signal.

The communication manager 906 may select a density of the reference signal within the frequency-domain-multiplexed signal.

The transmission component 904 may transmit, to the receiving device, an indication of a density of the reference signal within the frequency-domain-multiplexed signal.

The transmission component 904 may transmit, to the receiving device, an indication of a frequency mapping between the data signal and the reference signal in the frequency-domain-multiplexed signal.

The communication manager 906 may select a reference signal sequence associated with the frequency-domain-multiplexed signal.

The transmission component 904 may transmit, to the receiving device, an indication of a selected reference signal sequence associated with the frequency-domain-multiplexed signal.

The reception component 902 may receive, from the receiving device, capability information indicating a capability of the receiving device to process the frequency-domain-multiplexed signal.

The communication manager 906 may select at least one of a density of the reference signal within the frequency-domain-multiplexed signal or a reference signal sequence associated with the frequency-domain-multiplexed signal based at least in part on a modulation and coding scheme associated with the frequency-domain-multiplexed signal.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
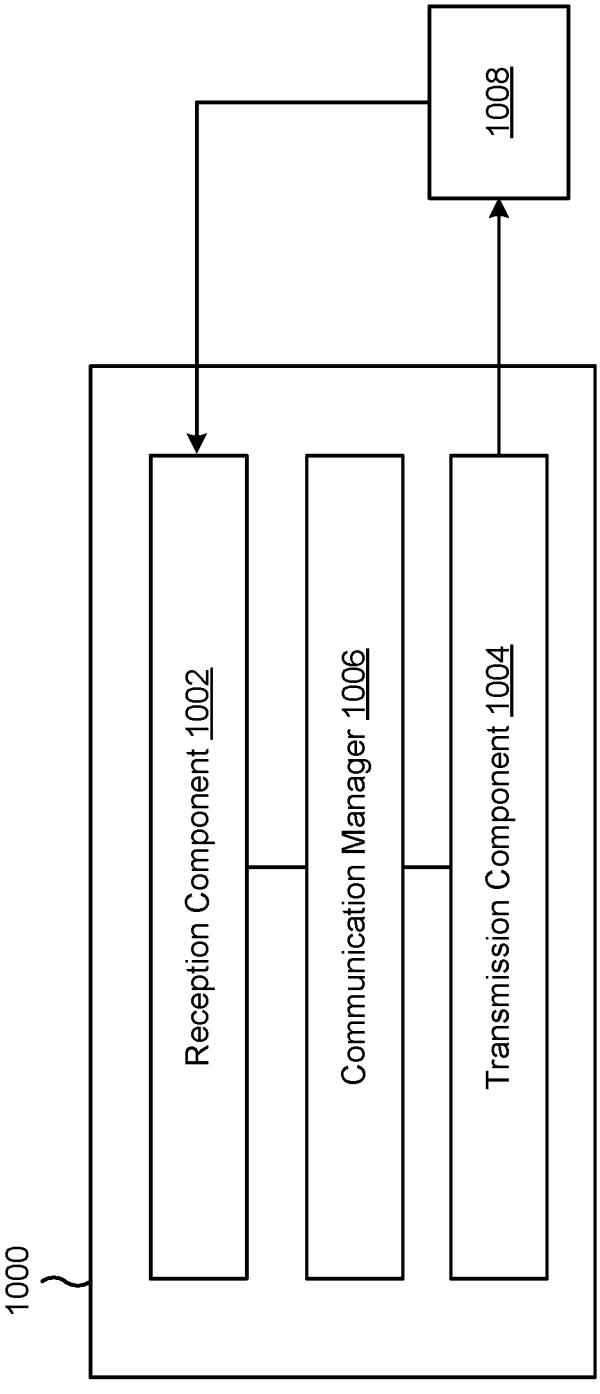
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a receiving device (e.g., receiving device 610), or a receiving device may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 or communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 5A-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node 110 or the UE 120 described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node 110 or the UE 120 described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node 110 or the UE 120 described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive, from a transmitting device, a frequency-domain-multiplexed signal, the frequency-domain-multiplexed signal being associated with frequency domain multiplexing of a data signal and a reference signal within a symbol of a DFT-s-OFDM waveform communication, the reference signal being one of a demodulation reference signal, a sounding reference signal, or a channel state information reference signal. The communication manager 1006 may perform a demapping of the data signal and the reference signal from the frequency-domain-multiplexed signal.

The reception component 1002 may receive, from the transmitting device, an indication of a density of the reference signal within the frequency-domain-multiplexed signal.

The reception component 1002 may receive, from the transmitting device, an indication of a frequency mapping between the data signal and the reference signal in the frequency-domain-multiplexed signal.

The reception component 1002 may receive, from the transmitting device, an indication of a selected reference signal sequence associated with the frequency-domain-multiplexed signal.

The transmission component 1004 may transmit, to the transmitting device, capability information indicating a capability of the receiving device to process the frequency-domain-multiplexed signal.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a transmitting device, comprising: generating a frequency-domain-multiplexed signal by performing frequency domain multiplexing of a data signal and a reference signal within a symbol of a DFT-s-OFDM waveform communication, the reference signal being one of a demodulation reference signal, a sounding reference signal, or a channel state information reference signal; and transmitting, to a receiving device, the frequency-domain-multiplexed signal.

Aspect 2: The method of Aspect 1, wherein one of the transmitting device or the receiving device is a user equipment, and wherein the other one of the transmitting device or the receiving device is a network node.

Aspect 3: The method of Aspect 1, wherein the transmitting device is a first UE, and wherein the receiving device is a second UE.

Aspect 4: The method of any of Aspects 1-3, wherein the data signal is associated with one of a physical downlink shared channel or a physical uplink shared channel.

Aspect 5: The method of any of Aspects 1-4, wherein the data signal is DFT-precoded and wherein the reference signal is not DFT-precoded.

Aspect 6: The method of any of Aspects 1-4, wherein the data signal and the reference signal are DFT-precoded.

Aspect 7: The method of any of Aspects 1-6, further comprising selecting a density of the reference signal within the frequency-domain-multiplexed signal.

Aspect 8: The method of any of Aspects 1-7, further comprising transmitting, to the receiving device, an indication of a density of the reference signal within the frequency-domain-multiplexed signal.

Aspect 9: The method of any of Aspects 1-8, further comprising transmitting, to the receiving device, an indication of a frequency mapping between the data signal and the reference signal in the frequency-domain-multiplexed signal.

Aspect 10: The method of any of Aspects 1-9, further comprising selecting a reference signal sequence associated with the frequency-domain-multiplexed signal.

Aspect 11: The method of any of Aspects 1-10, further comprising transmitting, to the receiving device, an indication of a selected reference signal sequence associated with the frequency-domain-multiplexed signal.

Aspect 12: The method of any of Aspects 1-11, further comprising receiving, from the receiving device, capability information indicating a capability of the receiving device to process the frequency-domain-multiplexed signal, wherein generating the frequency-domain-multiplexed signal is based at least in part on the capability information.

Aspect 13: The method of any of Aspects 1-12, further comprising selecting at least one of a density of the reference signal within the frequency-domain-multiplexed signal or a reference signal sequence associated with the frequency-domain-multiplexed signal based at least in part on a modulation and coding scheme associated with the frequency-domain-multiplexed signal.

Aspect 14: The method of any of Aspects 1-13, wherein the frequency-domain-multiplexed signal is associated with a multiple input multiple output communication having a transmission rank, and wherein the method further comprises selecting at least one of a density of the reference signal within the frequency-domain-multiplexed signal or a reference signal sequence associated with the frequency-domain-multiplexed signal based at least in part on the transmission rank.

Aspect 15: A method of wireless communication performed by a receiving device, comprising: receiving, from a transmitting device, a frequency-domain-multiplexed signal, the frequency-domain-multiplexed signal being associated with frequency domain multiplexing of a data signal and a reference signal within a symbol of a DFT-s-OFDM waveform communication, the reference signal being one of a demodulation reference signal, a sounding reference signal, or a channel state information reference signal; and demapping the data signal and the reference signal from the frequency-domain-multiplexed signal.

Aspect 16: The method of Aspect 15, wherein one of the transmitting device or the receiving device is a user equipment, and wherein the other one of the transmitting device or the receiving device is a network node.

Aspect 17: The method of Aspect 15, wherein the transmitting device is a first UE, and wherein the receiving device is a second UE.

Aspect 18: The method of any of Aspects 15-17, wherein the data signal is associated with one of a physical downlink shared channel or a physical uplink shared channel.

Aspect 19: The method of any of Aspects 15-18, wherein the data signal is DFT-precoded and wherein the reference signal is not DFT-precoded.

Aspect 20: The method of any of Aspects 15-18, wherein the data signal and the reference signal are DFT-precoded.

Aspect 21: The method of any of Aspects 15-20, further comprising receiving, from the transmitting device, an indication of a density of the reference signal within the frequency-domain-multiplexed signal, wherein demapping the data signal and the reference signal from the frequency-domain-multiplexed signal is based at least in part on the indication of the density of the reference signal within the frequency-domain-multiplexed signal.

Aspect 22: The method of any of Aspects 15-21, further comprising receiving, from the transmitting device, an indication of a frequency mapping between the data signal and the reference signal in the frequency-domain-multiplexed signal, wherein demapping the data signal and the reference signal from the frequency-domain-multiplexed signal is based at least in part on the indication of the frequency mapping between the data signal and the reference signal in the frequency-domain-multiplexed signal.

Aspect 23: The method of any of Aspects 15-22, further comprising receiving, from the transmitting device, an indication of a selected reference signal sequence associated with the frequency-domain-multiplexed signal, wherein demapping the data signal and the reference signal from the frequency-domain-multiplexed signal is based at least in part on the indication of the selected reference signal sequence associated with the frequency-domain-multiplexed signal.

Aspect 24: The method of any of Aspects 15-23, further comprising transmitting, to the transmitting device, capability information indicating a capability of the receiving device to process the frequency-domain-multiplexed signal, wherein receiving the frequency-domain-multiplexed signal is based at least in part on the capability information.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of")

What is claimed is:

1. A transmitting device for wireless communication, comprising:
   one or more memories; and
   one or more processors, coupled to the one or more memories, configured to:
      generate a frequency-domain-multiplexed signal by performing frequency domain multiplexing of a data signal and a reference signal within a symbol of a discrete Fourier transform spread orthogonal frequency domain multiplexing (DFT-s-OFDM) waveform communication, the reference signal being one of a demodulation reference signal, a sounding reference signal, or a channel state information reference signal; and
      transmit, to a receiving device, the frequency-domain-multiplexed signal and an indication of a frequency mapping between the data signal and the reference signal in the frequency-domain-multiplexed signal.

2. The transmitting device of claim 1,
   wherein one of the transmitting device or the receiving device is a user equipment, and wherein the other one of the transmitting device or the receiving device is a network node.

3. The transmitting device of claim 1,
wherein the transmitting device is a first user equipment (UE), and wherein the receiving device is a second UE.

4. The transmitting device of claim 1,
wherein the data signal is associated with one of a physical downlink shared channel or a physical uplink shared channel.

5. The transmitting device of claim 1,
wherein the data signal is DFT-precoded and wherein the reference signal is not DFT-precoded.

6. The transmitting device of claim 1,
wherein the data signal and the reference signal are DFT-precoded.

7. The transmitting device of claim 1,
wherein the one or more processors are further configured to select a density of the reference signal within the frequency-domain-multiplexed signal.

8. The transmitting device of claim 1,
wherein the one or more processors are further configured to transmit, to the receiving device, an indication of a density of the reference signal within the frequency-domain-multiplexed signal.

9. The transmitting device of claim 1,
wherein the one or more processors are further configured to select a reference signal sequence associated with the frequency-domain-multiplexed signal.

10. The transmitting device of claim 1,
wherein the one or more processors are further configured to transmit, to the receiving device, an indication of a selected reference signal sequence associated with the frequency-domain-multiplexed signal.

11. The transmitting device of claim 1,
wherein the one or more processors are further configured to receive, from the receiving device, capability information indicating a capability of the receiving device to process the frequency-domain-multiplexed signal,
wherein, to generate the frequency-domain-multiplexed signal, the one or more processors are further configured to generate the frequency-domain-multiplexed signal based at least in part on the capability information.

12. The transmitting device of claim 1,
wherein the one or more processors are further configured to select at least one of a density of the reference signal within the frequency-domain-multiplexed signal or a reference signal sequence associated with the frequency-domain-multiplexed signal based at least in part on a modulation and coding scheme associated with the frequency-domain-multiplexed signal.

13. The transmitting device of claim 1,
wherein the frequency-domain-multiplexed signal is associated with a multiple input multiple output communication having a transmission rank, and
wherein the one or more processors are further configured to select at least one of a density of the reference signal within the frequency-domain-multiplexed signal or a reference signal sequence associated with the frequency-domain-multiplexed signal based at least in part on the transmission rank.

14. A receiving device for wireless communication, comprising:
one or more memories; and
one or more processors, coupled to the one or more memories, configured to:
receive, from a transmitting device, a frequency-domain-multiplexed signal and an indication of a frequency mapping between a data signal and a reference signal in the frequency-domain-multiplexed signal, the frequency-domain-multiplexed signal being associated with frequency domain multiplexing of the data signal and the reference signal within a symbol of a discrete Fourier transform spread orthogonal frequency domain multiplexing (DFT-s-OFDM) waveform communication, the reference signal being one of a demodulation reference signal, a sounding reference signal, or a channel state information reference signal; and
perform a demapping of the data signal and the reference signal from the frequency-domain-multiplexed signal based at least in part on the indication of the frequency mapping.

15. The receiving device of claim 14,
wherein one of the transmitting device or the receiving device is a user equipment, and wherein the other one of the transmitting device or the receiving device is a network node.

16. The receiving device of claim 14,
wherein the transmitting device is a first user equipment (UE), and wherein the receiving device is a second UE.

17. The receiving device of claim 14,
wherein the data signal is associated with one of a physical downlink shared channel or a physical uplink shared channel.

18. The receiving device of claim 14,
wherein the data signal is DFT-precoded and wherein the reference signal is not DFT-precoded.

19. The receiving device of claim 14,
wherein the data signal and the reference signal are DFT-precoded.

20. The receiving device of claim 14,
wherein the one or more processors are further configured to receive, from the transmitting device, an indication of a density of the reference signal within the frequency-domain-multiplexed signal,
wherein, to perform the demapping of the data signal and the reference signal from the frequency-domain-multiplexed signal, the one or more processors are further configured to perform the demapping of the data signal and the reference signal from the frequency-domain-multiplexed signal based at least in part on the indication of the density of the reference signal within the frequency-domain-multiplexed signal.

21. The receiving device of claim 14,
wherein, to perform the demapping of the data signal and the reference signal from the frequency-domain-multiplexed signal, the one or more processors are further configured to perform the demapping of the data signal and the reference signal from the frequency-domain-multiplexed signal based at least in part on the indication of the frequency mapping between the data signal and the reference signal in the frequency-domain-multiplexed signal.

22. The receiving device of claim 14,
wherein the one or more processors are further configured to receive, from the transmitting device, an indication of a selected reference signal sequence associated with the frequency-domain-multiplexed signal,
wherein, to perform the demapping of the data signal and the reference signal from the frequency-domain-multiplexed signal, the one or more processors are further configured to perform the demapping of the data signal and the reference signal from the frequency-domain-multiplexed signal based at least in part on the indication of the selected reference signal sequence associated with the frequency-domain-multiplexed signal.

23. The receiving device of claim 14, wherein the one or more processors are further configured to transmit, to the transmitting device, capability information indicating a capability of the receiving device to process the frequency-domain-multiplexed signal, wherein, to receive the frequency-domain-multiplexed signal, the one or more processors are further configured to receive the frequency-domain-multiplexed signal based at least in part on the capability information.

24. A method of wireless communication performed by a transmitting device, comprising:

generating a frequency-domain-multiplexed signal by performing frequency domain multiplexing of a data signal and a reference signal within a symbol of a discrete Fourier transform spread orthogonal frequency domain multiplexing (DFT-s-OFDM) waveform communication, the reference signal being one of a demodulation reference signal, a sounding reference signal, or a channel state information reference signal; and transmitting, to a receiving device, the frequency-domain-multiplexed signal and an indication of a frequency mapping between the data signal and the reference signal in the frequency-domain-multiplexed signal.

25. The method of claim 24, further comprising at least one of: selecting a density of the reference signal within the frequency-domain-multiplexed signal, or transmitting, to the receiving device, an indication of the density of the reference signal within the frequency-domain-multiplexed signal.

26. The method of claim 24, further comprising at least one of: selecting a reference signal sequence associated with the frequency-domain-multiplexed signal, or transmitting, to the receiving device, an indication of a selected reference signal sequence associated with the frequency-domain-multiplexed signal.

27. A method of wireless communication performed by a receiving device, comprising:

receiving, from a transmitting device, a frequency-domain-multiplexed signal and an indication of a frequency mapping between a data signal and a reference signal in the frequency-domain-multiplexed signal, the frequency-domain-multiplexed signal being associated with frequency domain multiplexing of the data signal and the reference signal within a symbol of a discrete Fourier transform spread orthogonal frequency domain multiplexing (DFT-s-OFDM) waveform communication, the reference signal being one of a demodulation reference signal, a sounding reference signal, or a channel state information reference signal; and demapping the data signal and the reference signal from the frequency-domain-multiplexed signal based at least in part on the indication of the frequency mapping.

28. The method of claim 27, further comprising receiving, from the transmitting device, an indication of a density of the reference signal within the frequency-domain-multiplexed signal, wherein demapping the data signal and the reference signal from the frequency-domain-multiplexed signal is based at least in part on the indication of the density of the reference signal within the frequency-domain-multiplexed signal.

29. The method of claim 27, wherein the data signal is DFT-precoded and wherein the reference signal is not DFT-precoded.

30. The method of claim 27, wherein the data signal and the reference signal are DFT-precoded.

* * * * *